(12) United States Patent
Ueda

(10) Patent No.: US 6,480,680 B1
(45) Date of Patent: Nov. 12, 2002

(54) INFORMATION REPRODUCING APPARATUS AND CAMERA

(75) Inventor: Toshiharu Ueda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/473,531

(22) Filed: Dec. 28, 1999

(30) Foreign Application Priority Data

Dec. 28, 1998 (JP) ............................................. 10-372529
Dec. 28, 1998 (JP) ............................................. 10-372530

(51) Int. Cl.⁷ .......................... G03B 17/24; G03B 19/02
(52) U.S. Cl. ...................................... 396/319; 396/390
(58) Field of Search ................................. 396/319, 390; 360/2, 3, 46, 65, 66, 67

(56) References Cited

U.S. PATENT DOCUMENTS

| | | | | |
|---|---|---|---|---|
| 5,649,249 A | * | 7/1997 | Yoshida | 396/319 |
| 6,049,677 A | * | 4/2000 | Ueda et al. | 396/319 |
| 6,046,828 A | * | 5/2000 | Ueda et al. | 396/207 |
| 6,141,502 A | * | 10/2000 | Sasaki et al. | 396/319 |
| 6,144,808 A | * | 11/2000 | Okado et al. | 396/319 |
| 6,173,125 B1 | * | 1/2001 | Mizumoto et al. | 396/319 |
| 6,268,971 B1 | * | 7/2001 | Fujihara | 360/1 |

* cited by examiner

*Primary Examiner*—David M. Gray
*Assistant Examiner*—Melissa Koval

(57) ABSTRACT

In a camera which reproduces information recorded at a magnetic recording part of each frame of a film, a reproducing circuit is arranged to make a discrimination, without being affected by noises, between the presence and absence of information recorded on the film and to lessen errors of reproduction of information, a noise removing filter is arranged to have a variable passband, and a passband switch-over circuit is arranged to vary the passband of the filter between a passband to be set in making the discrimination between the presence and absence of information recorded on the film and a passband to be set in performing a decoding action on the information recorded on the film.

24 Claims, 17 Drawing Sheets

FIG. 16 (a) PRIOR ART
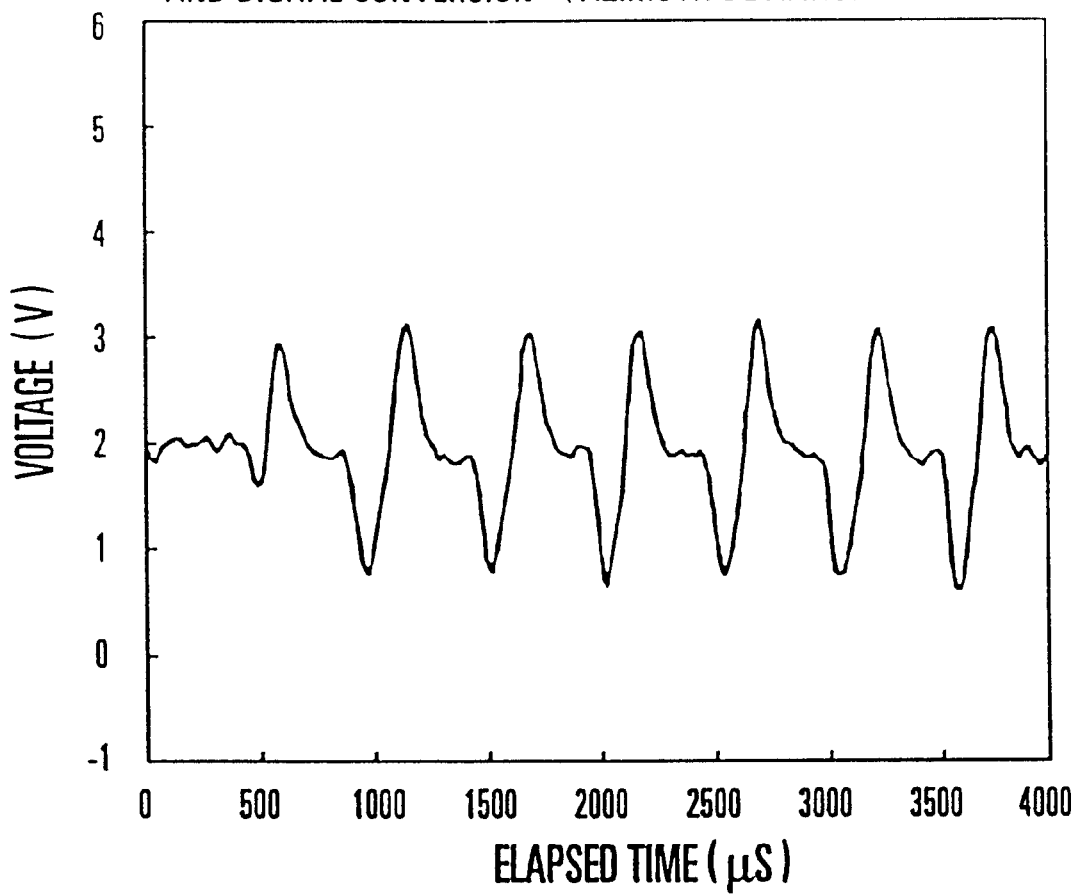

FIG. 16 ( b ) PRIOR ART
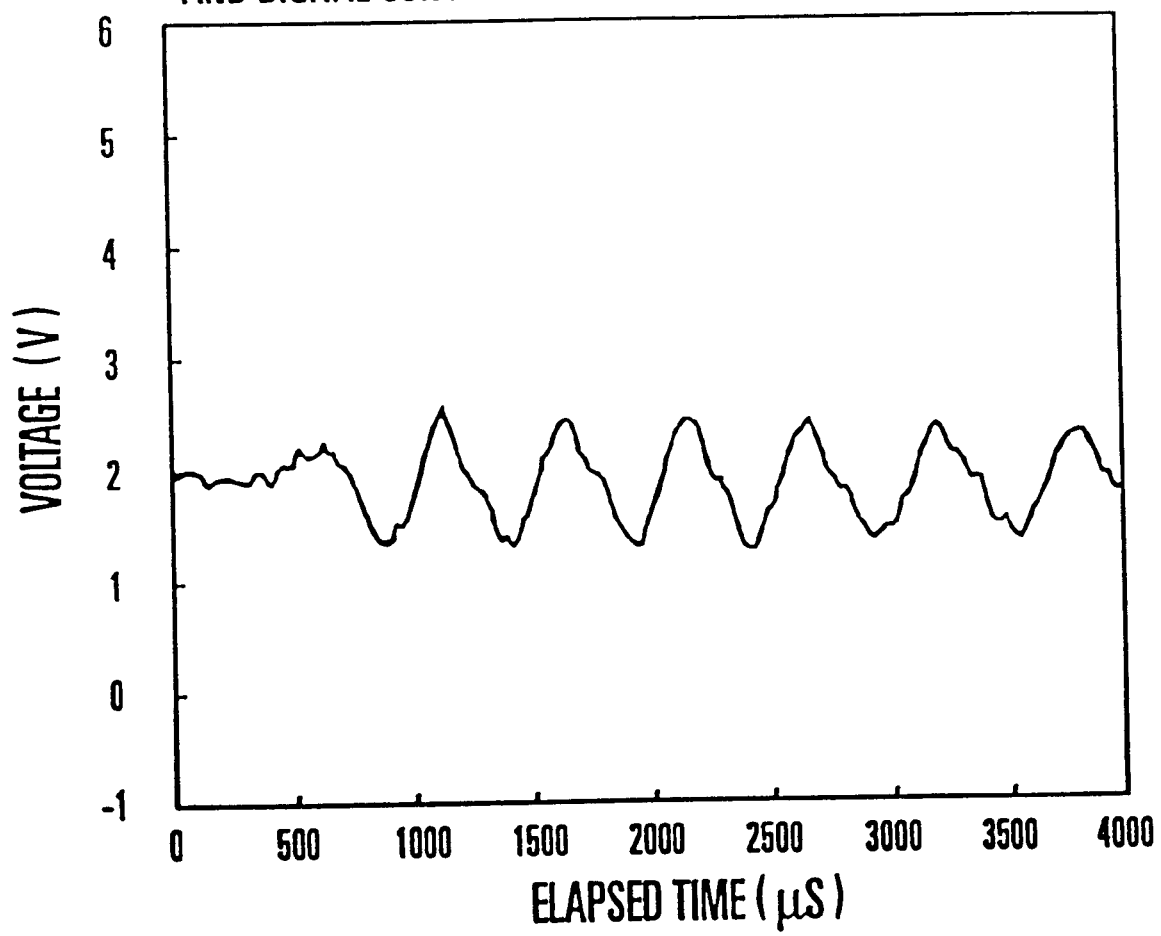

INFORMATION REPRODUCING APPARATUS AND CAMERA

BACKGROUND OF THE INVENTION

1. Field of the Invention

The present invention relates to an improvement on an information reproducing apparatus and a camera, for reproducing information recorded on a recording medium.

2. Description of Related Art

Cameras adapted for use of film cartridges of a type called IX240 are called APS cameras. It is well known that the cameras of this kind permit recording on the film some information about photo-taking conditions, dates, etc., by magnetic means or some other suitable means, so that information related to the photo-taking operation is recorded on a recording part corresponding to the exposed frame. Many of these cameras are arranged to have a so-called film midway loading function (hereinafter referred to as the MRC function). This MRC function permits use of a partially used (exposed) film by reloading the film in a state of having some frames left unexposed and by automatically setting each of the unexposed frame at a photo-taking aperture position.

The MRC function is generally performed in the following manner. When the camera is loaded with a partially used film, the camera reads magnetic information recorded at frames already exposed. Any frame having no magnetic information recorded there is recognized as an unexposed frame. Then, one of the unexposed frames is set to be used as a leading frame for photo-taking after reloading.

In carrying out the MRC function, if a magnetic information reproducing system disposed within the camera is affected by some external noise or the like, it is highly probable that the camera might mistake an unexposed frame for an exposed frame. To solve this problem, a filter passing frequency band of the magnetic information reproducing system is generally set at a narrow bandwidth to make the system not readily affected by the external noise or the like. This arrangement enables the camera to be capable of correctly recognizing the presence or absence of magnetic information. Hereinafter, this arrangement will be called a first prior art example.

The camera having the MRC function has another problem in respect of use of the MRC function. In a case where there are many partially used films, contents of records on the films are extremely difficult to manage. According to a method developed for solving that problem, magnetic information recorded at each of exposed frames, such as a title and photo-taking conditions, is read in transporting the film after the film is reloaded. Then, some representative data among the contents of the information read, such as data recorded at the last exposed frame, is displayed to let the user easily know contents of records. Hereinafter, that method will be called a second prior art example.

In the case of the second prior art example, the magnetic reproduced signal must be accurately read as data. To meet this requirement, the filter passing band must be arranged to be as wide as possible. It is also necessary that the rate of amplifying the reproduced signal must be suppressed to be relatively low, i.e., to a degree at which the reproduced signal does not saturate. The arrangement for making such setting makes it possible to let the user know information recorded on the film even in a case where a film taken out from the camera is reloaded to be used again. Therefore, the seriousness of the problems of the MRC function can be mitigated.

However, as a result of popularization of the cameras of the kind having the MRC function, there arises a case where one and the same film is desired to be used by a plurality of (two, for example) cameras. In such a case, however, even a slight difference in structural arrangement between the two cameras might bring about another problem. For example, with a film which is used for photo-taking only in part by one camera is loaded on another camera, an azimuth deviation of an information reproducing head (a difference in reading angle) might prevent the second camera from adequately reading the magnetic information. Then, "the exposed frame showing information" of the second prior art example or, in the worst case, "the leading unexposed frame recognizing action" of the first prior art example might become erroneous. In the event of such an error, the camera might fail to recognize the presence of a magnetic signal record or might make a double exposure to give overlapped pictures or the like.

FIGS. 16(a) and 16(b) show a difference in reproduced signal waveform between a case where the information reproducing head does not deviate in azimuth and another case where the information reproducing head deviates in azimuth by −1°.

Each of signals shown in FIGS. 16(a) and 16(b) has a voltage value of about 2 V at the center of the waveform. The signal includes a clock signal which serves as reference for every bit of information and drops from around the center voltage of 2 V, and data obtained for the clock signal rises from the center voltage of 2 V. The signal is recognized as "0" if the data is located on the left side of a 50% position with respect to the clock signal and as "1" if the data is on the right side of a 50% position with respect to the clock signal. Although the data is determined with a 50% position with respect to the clock signal set as the boundary, in order to lessen errors in making a discrimination between "0" and "1", the data is recorded, as a basic rule, to have the data "0" as close to a 30% position with respect the clock signal as possible and the data "1" as close to a 70% position with respect to the clock signal as possible. All the data used for reproduction shown in FIGS. 16(a) and 16(b) are assumed to have been recorded with data "0".

The reproduced waveform shown in FIG. 16(a) is obtained by reproducing data from a film with a reproducing head set at the same azimuth angle as a recording head used in recording the data on the above-stated condition. The signal amplitude is large (Vp −p≈2.2 V). This waveform permits accurate recognition of that the data is around 30%. In the case of FIG. 16(b), the reproduced waveform is obtained from the same film with a reproducing head set at a position which deviates about one degree from the azimuth angle of the recording head. Although the waveform is obtained from the same film, the signal amplitude of FIG. 16(b) is small (Vp −P≈1.4 V). The small amplitudes not only makes signal recognition difficult but also is apt to mislead the discrimination to be made between "0" and "1" of data.

The above-stated problem can be solved by providing the camera with some angle adjustment mechanism for adjusting the azimuth angle of a magnetic reproducing head while observing the signal level in process of a magnetic signal reproduction. However, such a method necessitates use of a complex mechanism, which is hardly adoptable for cameras which must meet the requirement of these days for reduction in size and cost.

BRIEF SUMMARY OF THE INVENTION

The invention is directed to the solution of the problems of the prior art described in the foregoing. In accordance with one aspect of the invention, there is provided an information reproducing apparatus or a camera arranged to be not only capable of making an accurate discrimination between the presence and absence of information, without being affected by noises, but also capable of lessening the possibility of errors in reproducing information.

In accordance with one aspect of the invention, there is provided a camera arranged to be not only capable of accurately setting the position of a leading frame among unexposed frames without being affected by noises but also capable of lessening errors in reproducing information.

In accordance with one aspect of the invention, there is provided a camera arranged to sufficiently have minimum necessary functions as a camera of the kind having a film midway loading (MRC) function and not only to enhance the accuracy of reproduction of information recorded on a film with which the camera is loaded but also to appositely provide the user of the camera with information relative to a film reloaded on the camera.

In accordance with one aspect of the invention, there is provided an information reproducing apparatus of the kind having reproducing means for reproducing information recorded on a recording medium and noise removing filter means which permits switch-over of its passband from one passband to another. The information reproducing apparatus is provided with passband switch-over means which is arranged to switch the passband of the filter means from one passband over to another according to whether the filter means is to be used for making a discrimination, by the reproducing means, between the presence and absence of information recorded on the recording medium or to be used for decoding the information recorded on the recording medium.

In accordance with one aspect of the invention, there is provided a camera having reproducing means for reproducing information recorded in an information recording area of a film and noise removing filter means which permits switch-over of its passband from one band to another. The camera is provided with passband switch-over (or varying) means which is arranged to switch the passband of the filter means from one passband over to another according to whether the filter means is to be used for an action of making a discrimination, by the reproducing means, between the presence and absence of information recorded on the film or to be used for decoding the information recorded in the information recording area.

In accordance with one aspect of the invention, there is provided a camera having reproducing means for reproducing information recorded in a recording area of a film, noise removing filter means which permits switch-over of its passband from one passband to another, and a film midway loading function. The camera having the film midway loading function is provided with the passband switch-over means which is arranged to switch the passband of the filter means from one passband over to another according to whether the filter means is to be used for an action of deciding a leading frame among unexposed frames on the basis of the result of a discrimination made by the reproducing means between the presence and absence of information recorded in the recording area of the film or to be used for a decoding action of the reproducing means on the information obtained from the recording area after the deciding action.

In accordance with one aspect of the invention, there is provided an information reproducing apparatus having reproducing means for reproducing information recorded on a recording medium. The information reproducing apparatus is provided with level deciding means for deciding whether the level of a reproduced signal is higher than a predetermined level or not, and information recognizing action switch-over means for changing the process of a recognizing action on the information recorded on the recording medium according to the result of decision made by the level deciding means.

In accordance with one aspect of the invention, there is provided a camera having reproducing means for reproducing information recorded at a magnetic recording part of a film. The camera is provided with level deciding means for deciding whether the level of a reproduced signal is higher than a predetermined level or not, and information recognizing action switch-over means for changing the process of a recognizing action on the information recorded on the film according to the result of decision made by the level deciding means.

The above and further aspects and features of the invention will become apparent from the following detailed description of preferred embodiments thereof taken in connection with the accompanying drawings.

BRIEF DESCRIPTION OF THE SEVERAL VIEWS OF THE DRAWING

FIGS. 16(a) and 16(b) are diagrams showing waveforms of signals reproduced by the conventional apparatus.

DETAILED DESCRIPTION OF THE INVENTION

Hereinafter, preferred embodiment of the invention will be described in detail with reference to the drawings.

Figure 1:
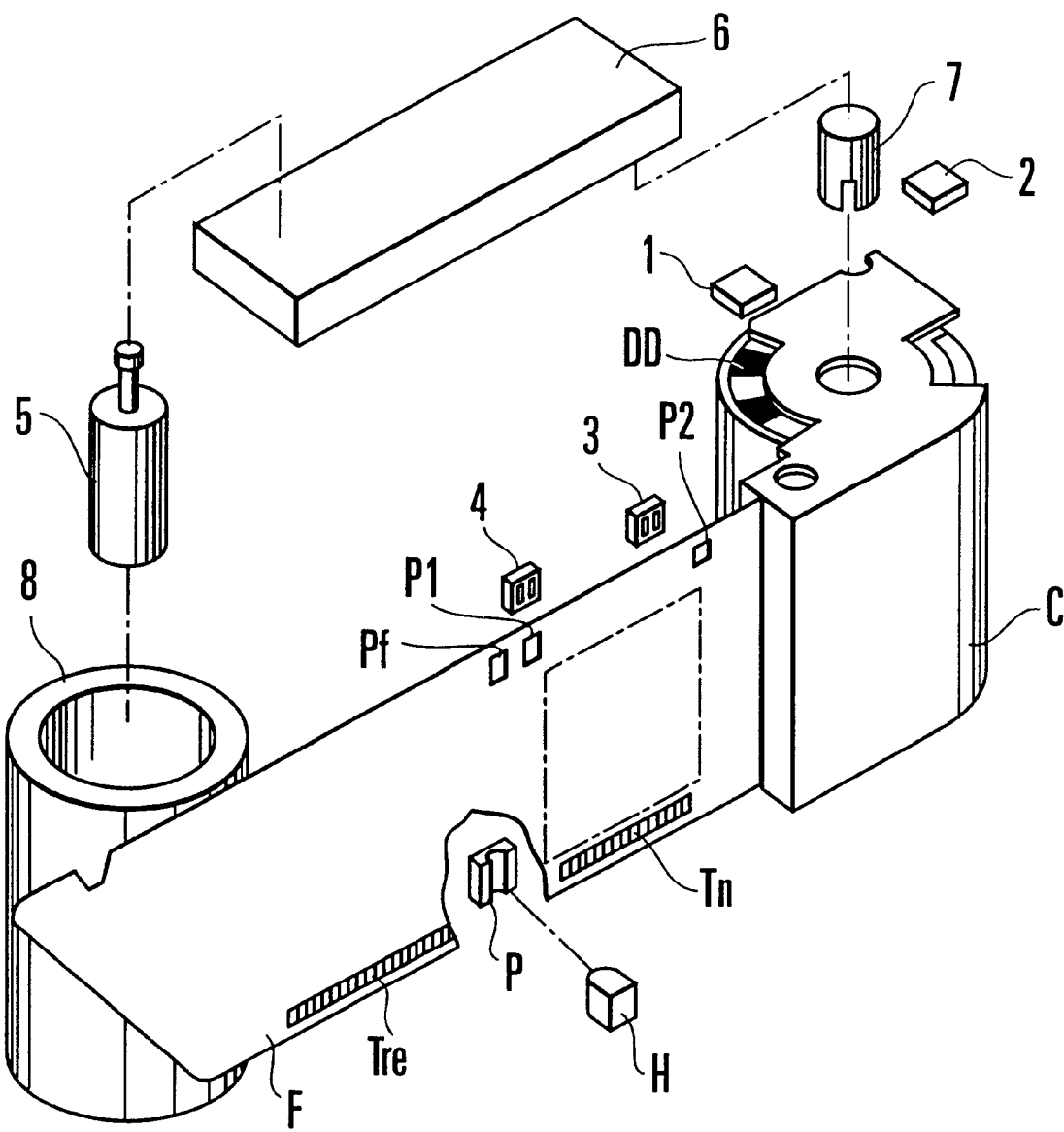
FIG. 1 is a perspective view showing the internal arrangement of essential parts of a camera according to each embodiment of the invention.

FIG. 1 is a perspective view showing the internal arrangement of essential parts of a camera according to a first embodiment of the invention.

Referring to FIG. 1, photo-reflectors 1 and 2 are arranged to read information indicated on a data disk DD disposed within a film cartridge C and to judge the state of the film cartridge C from among various film-using states including an unexposed state, a partially exposed state, an exposed state and a processed state (developed state). Photo-reflectors 3 and 4 are arranged to detect perforations Pf, P1, P2, ... provided in a film F and to generate signals including a signal to be used for indexing photo-taking frames of the film F and a timing signal for writing information. A film transport motor 5 is disposed within a spool 8. A gear train 6 is arranged to be used for winding and rewinding the film F. A fork 7 is provided for rewinding the film F. The spool 8 is provided for winding the film F.

The film cartridge C includes therein the data disk DD which is arranged to carry information about the sensitivity, a prescribed number of frames, etc., of the film F and to rotate in association with movement of the film F. A stop position where the data disk DD comes to a stop when the film cartridge C is ejected from a camera is basically determined and set according to the using state of the film F. The film F has a magnetic layer arranged along its edge on the base side thereof to permit magnetic recording of information at magnetic recording parts Tre, Tn, etc. The film F also has perforations Pf, P1, P2 ... formed in reference positions and positions corresponding to a photo-taking image plane. A magnetic head H is arranged to record (write) information into the magnetic recording parts Tr, Tn, etc., of the film F or to reproduce (read) recorded information from the magnetic recording parts Tr, Tn, etc. A pressing pad P is arranged to push the magnetic head H against the film F.

Figure 2:
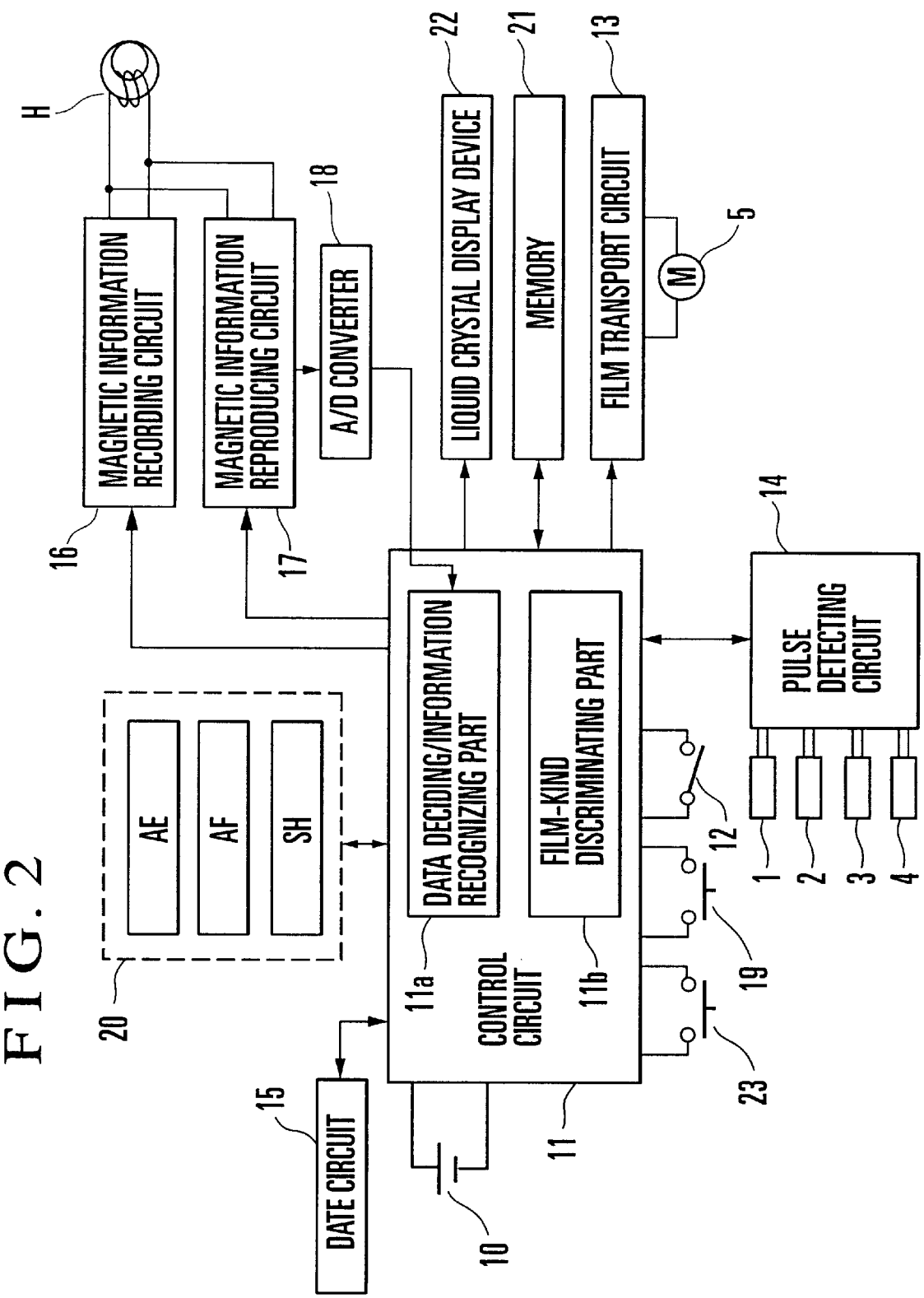
FIG. 2 is a block diagram showing the circuit arrangement of essential parts of the camera according to each embodiment of the invention.

FIG. 2 is a block diagram showing the circuit arrangement of essential parts of the camera. In FIG. 2, reference numeral 10 denotes a power source battery of the camera. A control circuit 11 is composed of a microcomputer or the like which is arranged to control various actions of the camera. The control circuit 11 includes therein a data deciding/information recognizing part 11a arranged to decide data obtained from an A/D converter 18 and to recognize the data as information, and a film-kind discriminating part 11b arranged to obtain signals from the photo-reflectors 1 and 2 through a pulse detecting circuit 14 and to detect the kind of the film in use. The data deciding/information recognizing part 11a and the film-kind discriminating part 11b do not have to be electric circuits but may be replaced with software parts as long as these parts are arranged to recognize the input signals through a software process.

A loading detecting switch 12 is arranged to detect that the camera is loaded with the film cartridge C. A film transport circuit 13 is arranged to drive the film transport motor 5 to perform winding and rewinding actions on the film F. A pulse detecting circuit 14 is arranged to convert the signals coming from the photo-reflectors 1 to 4 into signals corresponding to the control circuit 11. A date circuit 15 is provided for recognizing a date and arranged to perform actions to set date information to be used for information recording, etc. A magnetic information recording circuit 16 is arranged to drive the magnetic head H to record information of varied kinds into the magnetic recording parts Tre, Tn, etc., of the film F. A magnetic information reproducing circuit 17 is arranged to drive the magnetic head H to reproduce the information recorded at the magnetic recording parts Tre, Tn, etc., of the film F. For the purpose of describing the first embodiment, the combination of the magnetic head H and the magnetic information recording circuit 16 will be called a recording means, while the combination of the magnetic head H and the magnetic information reproducing circuit 17 will be called a reproducing means. The details of the reproducing means will be described in detail later with reference to FIG. 3. In the case of the first embodiment, information relative to photo-taking (information on a date, etc.) is assumed to be recorded by the recording means at the magnetic recording part Tn corresponding to each exposed frame after a photo-taking action thereon.

The A/D converter 18 is arranged to convert a magnetic signal (an analog signal) reproduced by the magnetic information reproducing circuit 17 into such information that can be recognized by the control circuit 11. The reproduced signal is thus sent to the data deciding/information recognizing part 11a which is disposed inside of the control circuit 11 as A/D data (A/D-converted data). A release switch 19 is provided for starting a photo-taking action. An AE/AF/SH circuit 20 is arranged to perform a light measuring action, a distance measuring action and shutter control. A memory 21 is a storage part arranged to store photo-taking information, etc. A liquid crystal display device 22 is a notifying means arranged to make displays for informing the camera user of the number of photo-taking frames of the film F, various photo-taking information and, in cases where a film rewound midway is reloaded on the camera, etc., to make displays to show necessary information about such a film. A manual rewinding switch 23 (hereinafter referred to as the MR switch) is provided for allowing a manual film rewinding operation to forcibly rewind a partially exposed film when the film is still in a state of having only some of all usable frames exposed, leaving other frames unexposed.

Figure 3:
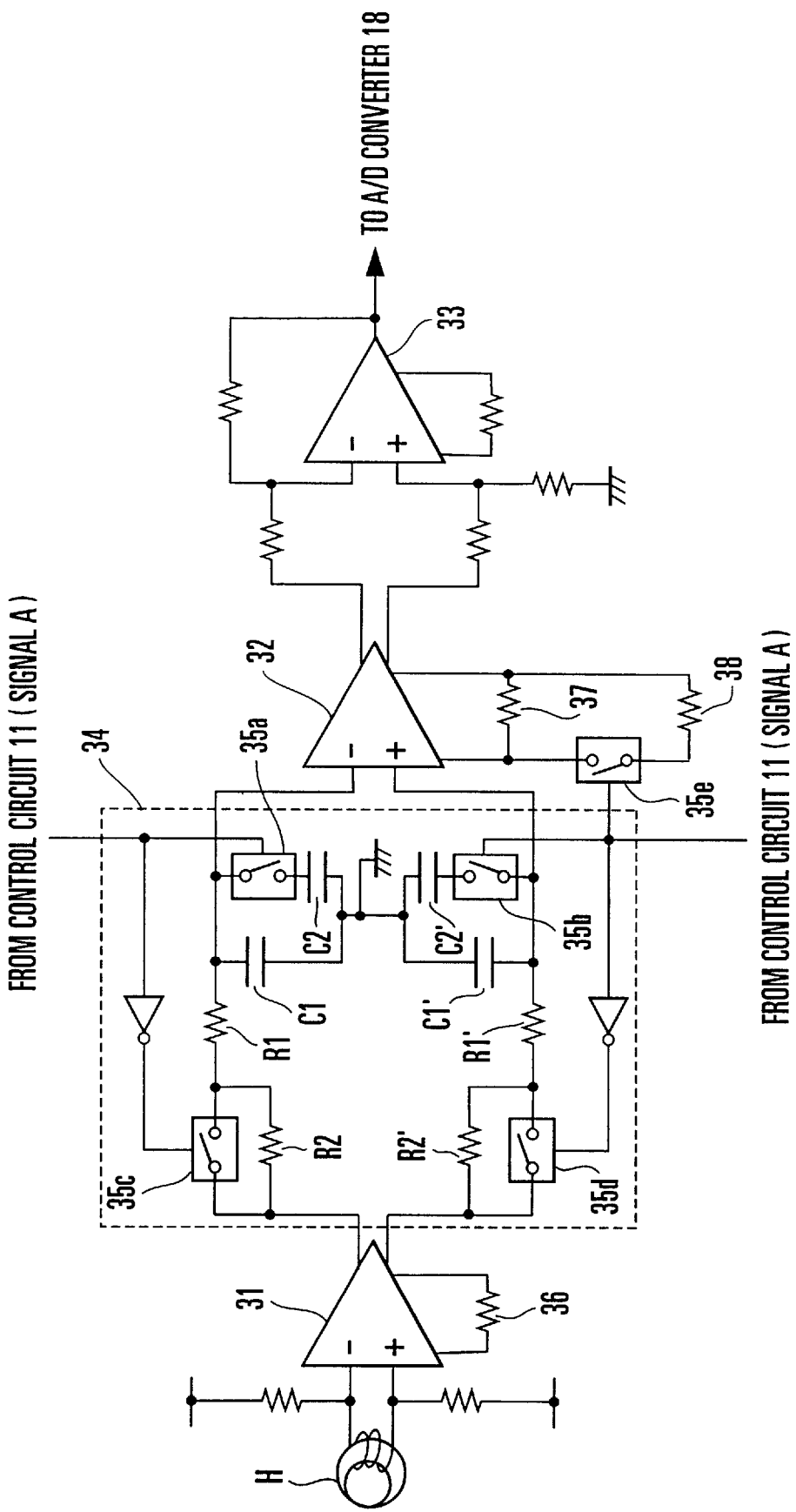
FIG. 3 is a circuit diagram showing in detail the arrangement of a reproducing means according to a first embodiment of the invention.

FIG. 3 is a circuit diagram showing, by way of example, the details of the above-stated reproducing means. Referring to FIG. 3, amplifiers 31, 32 and 33 are arranged respectively to amplify the reproduced signal of magnetically recorded data outputted from the magnetic head H. The amplifiers 31, 32 and 33 are serially connected in three stages. A filter circuit 34 is arranged to remove noises from the reproduced signal amplified by the amplifier 31. Analog switches 35a, 35b, 35c and 35d are arranged to switch the time constant of the filter circuit 34 from one value over to another by switching between a combination of resistors R1 and R2 and capacitors C1 and C2 and another combination of resistor R1' and R2' and capacitors C1' and C2'. The on-state or off-state of the analog switches are arranged to vary according to a control signal (signal A) coming from the control circuit 11. Amplifying degree adjusting resistors 36, 37 and 38 are connected to parts between the input and output parts of the amplifiers 31 and 32 and are arranged to determine the degree of amplification.

The degree of amplification of the amplifier 32 changes from one degree over to another according to the on/off state of the analog switch 35e. The on/off state of the analog switch 35e varies according to the control signal, i.e., a signal A, coming from the control circuit 11. When the level of the signal A becomes high (H), the analog switch 35e turns on to cause the value of resistance for adjusting the amplifying degree of the amplifier 32 to become a parallel-combined resistance of the resistors 37 and 38. In this case, a high amplifying degree is set due to the characteristic of the amplifier. In a case where the level of the signal A becomes low (L), the analog switch 35e turns off. Then, the resistance for adjusting the amplifying degree of the amplifier 32 becomes the value of the resistor 37. A low amplifying degree is set in that case because of the characteristic of the amplifier.

The resistors R1 and R2 are series-connected and are thus connected to one of output terminals of the amplifier 31. The resistors R2' and R1' are also series-connected and connected to the other output terminal of the amplifier 31. The resistors R2 and R2' respectively have analog switches 35c and 35d parallel-connected to them. A capacitor C1 is connected between the output side of the resistor R1 and the ground. A capacitor C1' is connected between the output side of the resistor R1' and the ground. The analog switch 35a and a capacitor C2 are series-connected to each other and are connected to the capacitor C1 in parallel thereto. The analog switch 35b and the capacitor C2' are series-connected to each other and are parallel-connected to the capacitor C1'.

In the filter circuit 34, when the level of the control signal (signal A) sent from the control circuit 11 to the analog switches 35a and 35b becomes high (H), the analog switches 35c and 35d turn off while the analog switches 35a and 35b turn on. Then, the filter circuit 34 sets a filter for a low speed having a first passband which is at a low time constant (a narrow band). In a case where the level of the control signal (signal A) sent from the control circuit 11 to the analog switches 35a and 35b becomes low (L), the analog switches 35a and 35b turn off while the analog switches 35c and 35d turn on. The filter circuit 34 then sets a filter for a high speed having a second passband which is at a high time constant (wide band).

Figure 4:
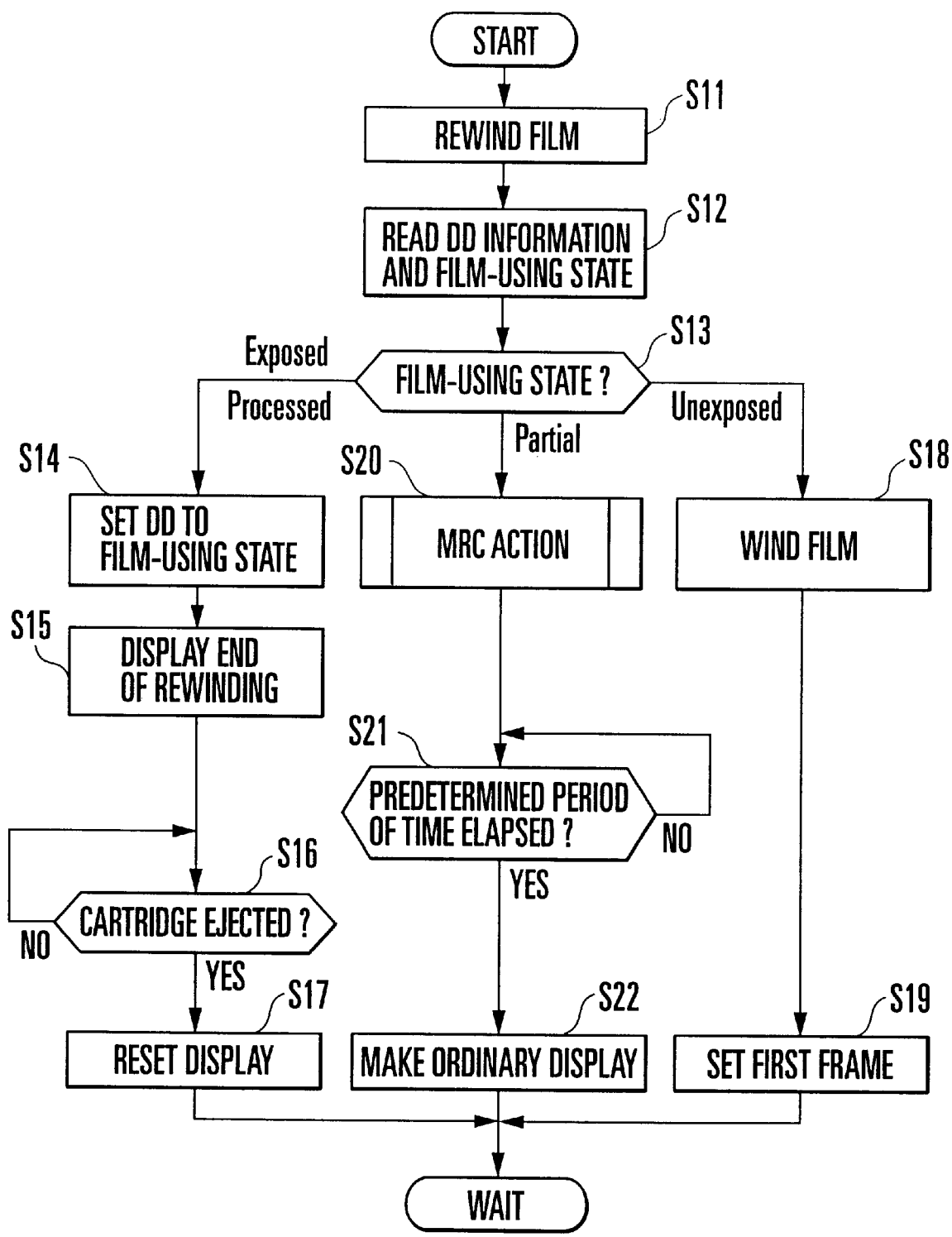
FIG. 4 is a flow chart showing a flow of actions to be performed in the first embodiment of the invention when the camera is loaded with a film cartridge.

FIG. 4 is a flow chart showing a flow of actions to be performed by the control circuit 11 in the first embodiment in loading the camera with a film. In other words, FIG. 4 shows a sequential flow of processes to be executed when the loading detecting switch 12 is caused to turn on by loading the camera with the film cartridge C.

At a step S11 of FIG. 4, the film transport circuit 13 is caused to drive the film transport motor 5. The film transport motor 5 causes the rewinding fork 7 to rotate in the direction of film rewinding. At a step S12, the information carried by the data disk DD which rotates according to the movement of the rewinding fork 7 within the film cartridge C is obtained by the film-kind discriminating part 11b through the photo-reflectors 1 and 2 and the pulse detecting circuit 14. With the information thus obtained, the using state of the loaded film cartridge C is discriminated and recognized from among an unexposed state, a partially exposed state, an exposed state and a processed (developed) state according to the signal detection timing of the photo-reflector 1.

At a step S13, a check is made for the result of discrimination of a film-using state of the film cartridge C. If the film cartridge C is found either to be exposed or to be processed (developed), the flow proceeds to a step S14. If it is found to be in the partially exposed state, the flow proceeds to a step S20. If it is found to be in the unexposed state, the flow proceeds to a step S18.

At the step S14, the data disk DD is rotated by the film transport motor 5 to its position of the film-using state recognized, i.e., the exposed state or the processed (developed) state on the basis of a signal for the data disk DD generated by the photo-reflector 1 and the pulse detecting circuit 14. With the data disk DD set in this position, the film transport motor 5 is brought to a stop. At the next step S15, the liquid crystal display device 22 is caused to display the end of film rewinding, for example, by causing a cartridge mark to flicker on the display. At a step S16, a check is made for the state of the loading detecting switch 12. When the switch 12 is found to have turned off, the film cartridge C is considered to have been ejected from the camera, and the flow of operation proceeds to a step S17. At the step S17, the display made on the liquid crystal display device 22 at the step S15 is reset, and the flow comes into a standby state for the next operation.

In a case where the flow proceeds from the step S13 to the step S18, the film transport circuit 13 is caused to drive the film transport motor 5 to perform a winding action on the film F (by rotating the spool 8). Then, the flow proceeds from the step S18 to a step S19. At the step S19, the perforations Pf, P1 and P2 are detected through the photo-reflectors 3 and 4 and the pulse detecting circuit 14 to obtain a detection signal. Then, on the basis of timing of the detection signal, the film is moved by the film transport motor 5 to bring its first frame to a photo-taking image position, i.e., an aperture position. With the first frame adjusted to the aperture position, the film transport motor 5 is brought to a stop. Further, the liquid crystal display device 22 is caused to display "1" which represents the first frame as a film frame counter. After that, the flow comes into the standby state for the next operation.

If the flow proceeds from the step S13 to the step S20 with the film F recognized as in the partially exposed state, a film winding action is performed on the film F. In this case, at the step S20, the film F is wound to find a leading frame from among unexposed frames. For this purpose, the reproducing means composed of the magnetic head H and the magnetic information reproducing circuit 17 is caused to read magnetic information recorded at the magnetic recording part Tn for a frame last exposed among other exposed frames of the film F. With the last exposed frame thus found, the next frame is decided to be the leading unexposed frame and is set at the (photo-taking) aperture position (not shown). The processes of the step S20 is the so-called MRC action mentioned in the foregoing. The MRC action will be described in detail later with reference to FIG. 5. At a step S21, a check is made for the count value of a timer (not shown) to find if a predetermined period of time, say, 5 sec., has elapsed. If so, the flow proceeds from the step S21 to a step S22. At the step S22, the liquid crystal display device 22 is caused to make an ordinary display. If a film counter display on the liquid crystal display device 22 shows, for example, "10", the display indicates the tenth frame as the set photo-taking frame (unexposed frame). After the step S22, the flow comes into a standby state for the next operation.

Figure 5:
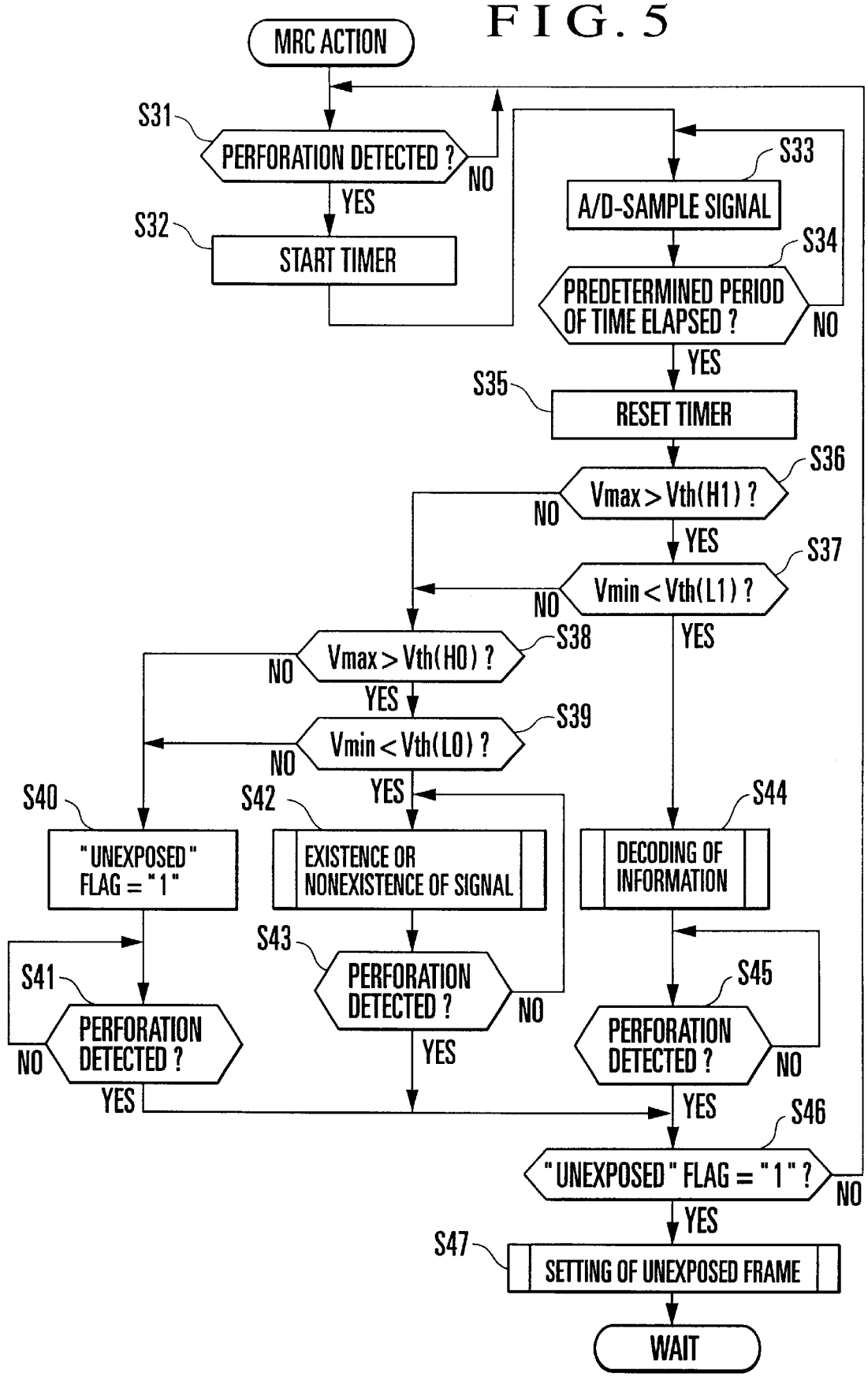
FIG. 5 is a flow chart showing the MRC action to be performed in the first embodiment of the invention.

FIG. 5 is a flow chart showing a sequence of processes to be executed for the above-stated MRC action of the step S20 shown in FIG. 4. In the stage when the flow of operation enters this sequence of processes (subroutine), the film transport circuit 13 is supposed to be performing a film winding action by driving the film transport motor 5 to rotate the spool 8.

At a step S31 of FIG. 5, a check is made to find if arrival of the perforation P1 which is the first of the perforations provided for every frame of the film F is detected by the photo-reflector 3 and the pulse detecting circuit 14 for a film portion already transported. Upon detection of the arrival of the perforation P1, the flow proceeds to a step S32. At the step S32, a timer (not shown) is caused to start counting a predetermined period of time which is, for example, 10 msec. At a step S33, a reproduced signal obtained from the magnetic recording part Tn of the film F by the reproducing means following the transport of the film F is A/D-converted into data by the A/D converter 18. The data obtained is taken in the data deciding/information recognizing part 11a of the control circuit 11. The control signal (signal A) from the control circuit 11 to the analog switches 35a to 35e is set at a low (L) level which is for a high speed filter of a low degree of amplification.

At the next step S34, the timer which is caused to start counting at the step S32 is checked to find if the predetermined period of time, say, 10 msec., has elapsed. If so, the flow proceeds to a step S35. If not, the flow returns to the step S33. At the step S35, the timer is brought to a stop and reset. At a step S36, a maximum value Vmax of the magnetic reproduced data taken into the data deciding/information recognizing part 11a of the control circuit 11 within the predetermined period of time is compared with a certain preset reference value Vth(H1). If the maximum value Vmax is larger than the reference value Vth(H1), the flow proceeds to a step S37. If not, the flow proceeds to a step S38.

At the step S37, a minimum value Vmin of the magnetic reproduced data taken into the data deciding/information recognizing part 11a of the control circuit 11 within the predetermined period of time is compared with a preset reference value Vth(L1). If the value Vmin is found to be less than the value Vth(L1), the flow proceeds to a step S44. If not, the flow proceeds to the step S38. At the step S38, the maximum value Vmax taken into the data deciding/information recognizing part 11a of the control circuit 11 within the predetermined period of time is compared with another preset reference value Vth(H0). If the value Vmax is found to be larger than the value Vth(H0), the flow proceeds to a step S39. If not, the flow proceeds to a step S40.

At the step S39, the minimum value Vmin of the magnetic reproduced data taken into the data deciding/information recognizing part 11a of the control circuit 11 within the predetermined period of time is compared with a preset reference value Vth(L0). If the value Vmin is found to be smaller than the value Vth(L0), the flow proceeds to a step S42. If not, the flow proceeds to the step S40.

The above-stated reference values Vth(H1), Vth(L1), vth(H0) and vth(L0) are in the relation of "Vth(H1)>Vth(H0)>Vth(L0)>Vth(L1)". By using a reference potential V0 of the reproduced signal set as a center value, these reference values are set to be in a relation of "Vth(H1)>Vth(H0)>V0>Vth (L0)>Vth(L1)".

At the step S40, an unexposed state flag provided for recognition of an unexposed state at a control memory (not shown) which is arranged within the control circuit 11 is set at "1". At a step S41, a check is made for detection of the perforations P1 and P2 (corresponding to each frame) by the photo-reflectors 3 and 4 and the pulse detecting circuit 14 to find if a frame portion of the film F has come to the predetermined aperture position. If so, the flow proceeds to a step S46.

At the step S42, information which indicates the presence of a reproduced signal obtained from the magnetic recording part Tn by the reproducing means following the transport of the film F is taken in the data deciding/information recognizing part 11a of the control circuit 11 through the A/D converter 18. Further, at this step S42, the degree of amplification and the filter passband of the reproducing means are changed and adjusted as necessary. The details of this action will be described later with reference to FIG. 6. At the next step S43, a check is made for detection of the perforations P1 and P2 (corresponding to each frame) by the photo-reflectors 3 and 4 and the pulse detecting circuit 14 to find if a frame portion of the film F has come to the predetermined aperture position. If so, the flow proceeds to a step S46 after resetting the amplifying degree and the filter passband of the reproducing means changed by the step S42 back to their initial values. If not, the film F is considered to have been not transported to the extent of one frame portion as yet, and the flow returns from the step S43 to the step S42.

At the step S44, information indicating the presence of a reproduced signal obtained from the magnetic recording part Tn by the reproducing means following the transport of the film F is taken in the data deciding/information recognizing part 11a of the control circuit 11 through the A/D converter 18. Then, the information thus obtained is decoded. The details of this decoding action will be described later with reference to FIGS. 7 and 8. At the next step S45, a check is made for detection of the perforations P1 and P2 (corresponding to each frame) by the photo-reflectors 3 and 4 and the pulse detecting circuit 14 to find if a frame portion of the film F has come to the predetermined aperture position. If so, i.e., upon completion of one-frame transport, the flow proceeds to a step S46.

At the step S46, a check is made to find if the unexposed state flag provided for recognizing an unexposed state at the control memory within the control circuit 11 is set at "1". If so, the flow proceeds to a step S47. If not, the flow returns to the step S31. At the step S47, the film is transported to a position where its frame portion recognized as unexposed is set at the aperture position. Then, information about various matters is displayed by the liquid crystal display device 22. The details of this step S47 will be described later with reference to FIG. 9.

The sequence of processes of the MRC action comes to an end, and the flow of operation shifts from the step S20 to a step S21 of FIG. 4.

In the sequence of processes described above, the initial A/D sampling is performed for a predetermined period of time (at steps S32 to S35). However, the invention is not limited to this sampling process. The sampling for the predetermined period of time may be differently arranged. For example, each bit of the magnetic information is recognized from the data sampled and a predetermined number of bits thus recognized is considered to define the initial sampling.

In deciding the level of the sampled magnetic signal at the steps S36 to S39, all these steps are arranged to make decision without including any reference values. However, the invention is not limited to this arrangement. For example, the step S36 may be changed to make a check for Vmax≧Vth(H1). In other words, the value Vmax may be decided either to be at the reference value and above or to be at the reference value and below.

Further, in the sequence of processes described above, the bits of the magnetic data are judged to be "0" or "1" according to upward or downward changes of them found by comparing the data with data last sampled by the A/D converter 18. However, the invention is not limited to this arrangement. This arrangement may be changed, for example, to set a decision level of a comparator according to the level of the reproduced signal sampled at the steps S33, etc., of FIG. 5, and to digitize the reproduced signal by the comparator before making a discrimination between "0" and "1".

Figure 6:
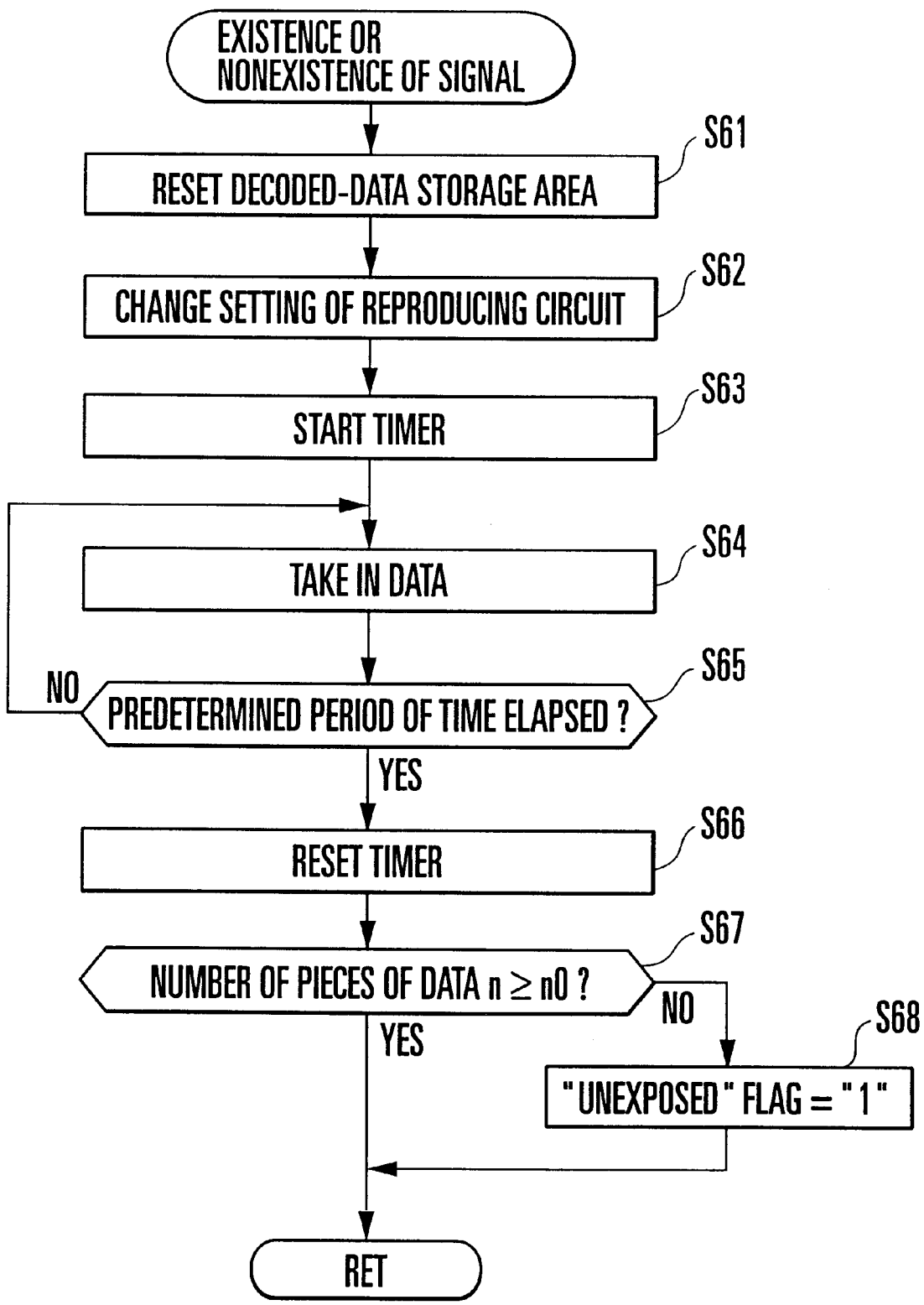
FIG. 6 is a flow chart showing a flow of actions to be performed in the first embodiment of the invention in deciding the presence or absence of a magnetic signal.

FIG. 6 is a flow chart showing a sequence of processes to be executed in deciding existence (presence) or nonexistence (absence) of a magnetic signal at the step S42 in FIG. 5.

At a step S61 of FIG. 6, a magnetic signal decoded-data storage area of a data storing memory (not shown) which is disposed within the control circuit 11 is reset and cleared. At the same time, the data at a data counter (not shown) is also reset. At a step S62, the level of the control signal (signal A) from the control circuit 11 to the analog switches 35a to 35e is changed to a high (H) level. The current set state of the reproducing means is changed to the high-amplifying-degree and low-speed filter setting. At a step S63, the timer (not shown) is caused to start counting a predetermined length of time which is, for example, 1 sec. At a step S64, the reproduced signal obtained from the magnetic recording part Tn by the reproducing means following the transport of the film F is taken in the data deciding/information recognizing part 11a of the control circuit 11 as data converted by the A/D converter 18. At the data deciding/information recognizing part 11a, the changing direction of the data taken in is found and the state of being divided (by bit) of the data is found from the changing direction. The number of bits of the data thus found is stored at a counter (not shown).

At the next step S65, the timer (not shown) which is caused to start counting at the step S62 is checked to find if the predetermined period of time, say, 1 sec., has elapsed. If so, the flow proceeds to a step S66. If not, the flow returns to the step S64. At the step S66, the timer (not shown) is reset by causing the timer to stop counting. At a step S67, the number n of magnetic data taken in the data deciding/information recognizing part 11a within a predetermined period of time is compared with a reference data number n0 to find if the result of comparison is n≧n0. If not, the flow proceeds to a step S68. If so, the sequence of processes is terminated, and the flow shifts to the step S43 of FIG. 5.

At the step S68, the "unexposed" flag which is provided within the control memory (not shown) for recognizing an unexposed state is set at "1". Then, this sequence of processes is terminated, and the flow shifts to the step S43 of FIG. 5.

Figure 7:
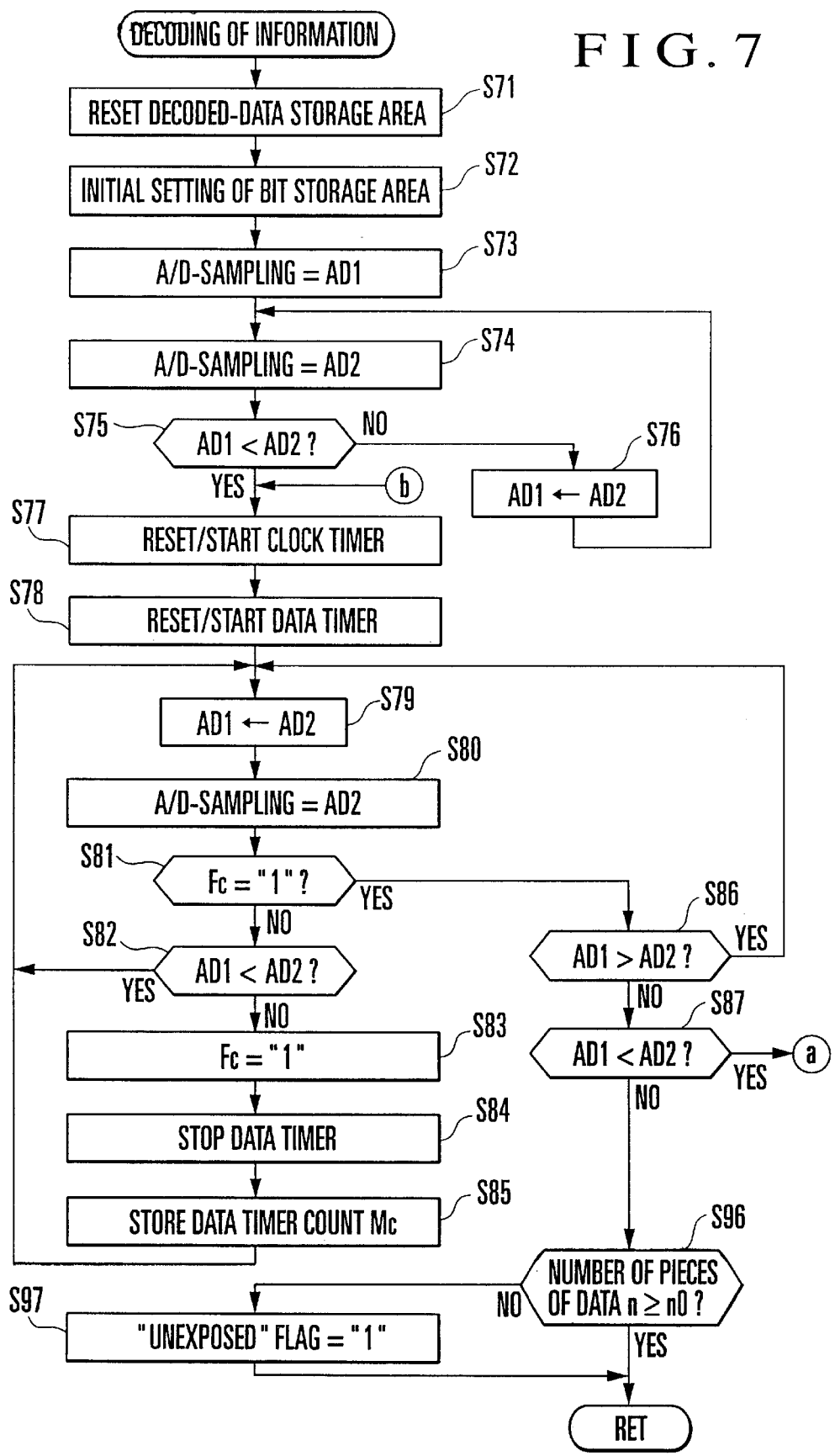
FIG. 7 is a flow chart showing a flow of decoding actions to be performed in the first embodiment of the invention.
Figure 8:
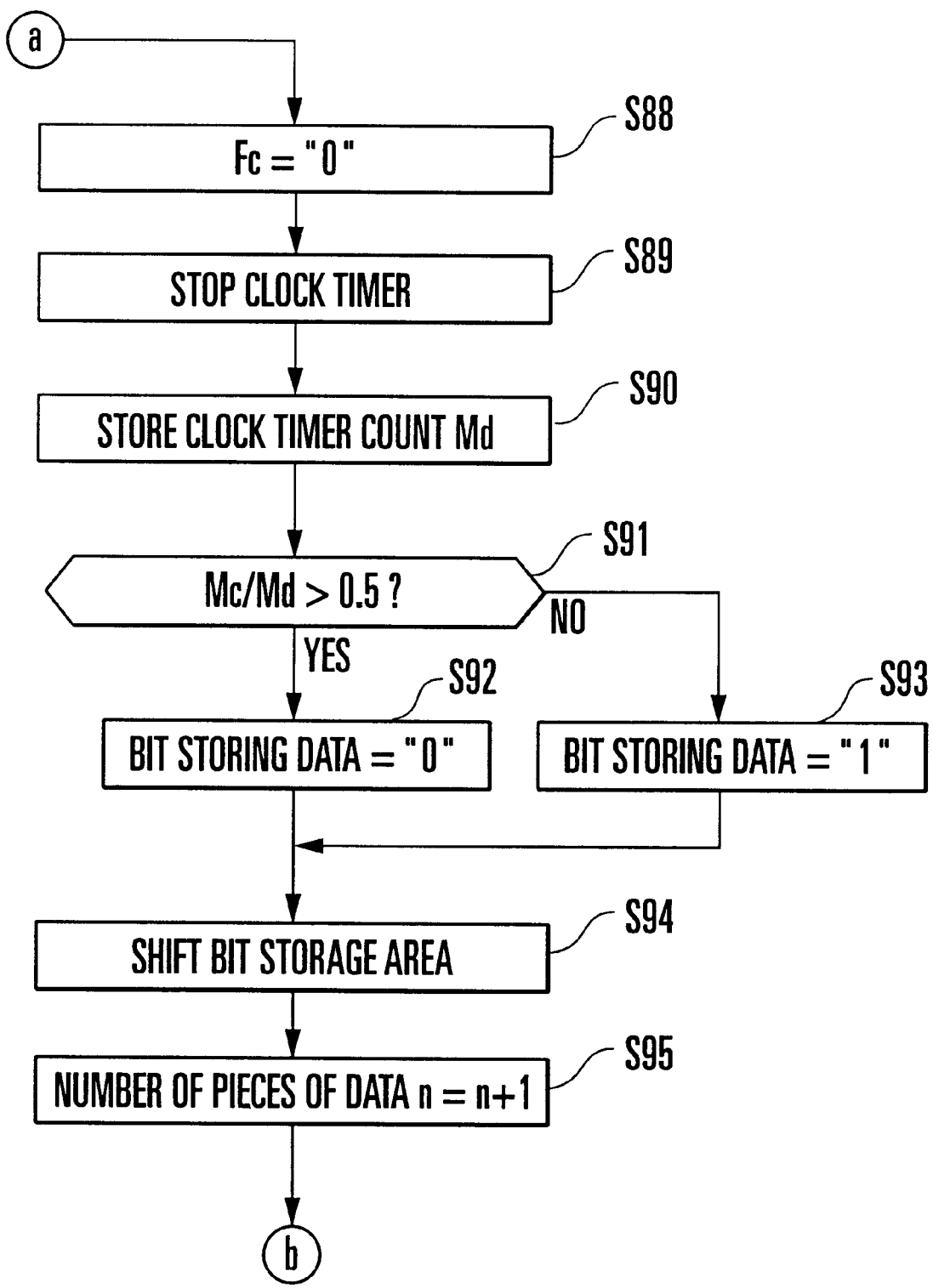
FIG. 8 is a flow chart showing a flow of actions continuing from the flow of actions shown in FIG. 7.

FIGS. 7 and 8 are flow charts showing in detail the magnetic signal information decoding action to be executed at the step S44 shown in FIG. 5.

At a step S71 of FIG. 7, the magnetic signal decoded-data storage area of the data storage memory (not shown) which is disposed within the control circuit 11 is reset and cleared. At the same time the data of the data number counter (not shown) is also reset. At a step S72, for the purpose of storing data in the order of bits designated within the decoded-data storage area, a first bit storage area is designated (initial setting). For example, an area of address "0" and the 0-th bit is designated. At the next step S73, a reproduced signal obtained from the magnetic recording part Tn by the reproducing means following the transport of the film F is taken into a designated area AD1 of the memory (not shown) disposed within the control circuit 11, as data (voltage data) converted by the A/D converter 18.

At a step S74, another reproduced signal obtained from the magnetic recording part Tn by the reproducing means following the transport of the film F is taken into a designated area AD2 of the memory (not shown) disposed within the control circuit 11, as data (voltage data) converted by the A/D converter 18. A time interval between the steps S73 and S74 is assumed to be several scores of μsec. At a step S75, the data of the area AD1 and that of the area AD2 are compared with each other to find if the data of the area AD2 is larger than that of the area AD1. If not, the flow proceeds to a step S76. If so, the flow proceeds to a step S77. At the step S76, the data stored at the designated area AD2 of the memory (not shown) within the control circuit 11 is transferred to the designated area AD1 of the same memory. The flow then returns from the step S76 to the step S74.

At the step S77, a timer (clock timer) (not shown) which is arranged to count data clock-time is reset and is caused to start counting. At a step S78, a timer (data timer) (not shown) which is arranged to count data time is reset and caused to start counting. At a step S79, the data stored at the designated area AD2 of the memory (not shown) disposed within the control circuit 11 is transferred to the designated area AD1 of the memory. At a step S80, a reproduced signal which is obtained from the magnetic recording area Tn by the reproducing means following the transport of the film F is taken in the designated area AD2 of the memory within the control circuit 11, as data (voltage data) converted by the A/D converter 18.

At the next step S81, a check is made to find if a data recognizing flag Fc located at a designated area of the memory (not shown) disposed within the control circuit 11 is at "1". If so, the flow proceeds from the step S81 to a step S86. If not, the flow proceeds to a step S82. At the step S82, the data of the area AD1 and that of the area AD2 taken in at the steps S79 and S80 are compared with each other to find if the data of the area AD1 is smaller than that of the area AD2. If not, the flow proceeds to a step S83. If so, the flow returns to the step S79. At the step S83, the data recognizing flag Fc which is at a designated area of the memory within the control circuit 11 is set at "1".

At a step S84, the data timer which is caused to start counting at the step S78 is stopped from counting. At the next step S85, the count value of the data timer which is stopped from counting at the step S84 is stored as a data-timer count data Mc at a designated area of the memory (not shown) disposed within the control circuit 11. The flow then returns to the step S79.

At the step S86, the data of the area AD1 and that of the area AD2 which are taken in at the steps S79 and S80 are compared with each other to find if the data of the area AD1 is larger than that of the area AD2. If not, the flow proceeds to a step S87. If so, the flow returns to the step S79. At the step S87, the data of the area AD1 and that of the area AD2 which are taken in at the steps S79 and S80 are compared with each other to find if the data of the area AD1 is smaller than that of the area AD2. If not, the flow proceeds to a step S96. If so, the flow proceeds to a step S88 of FIG. 8.

At the step S88 of FIG. 8, the data recognizing flag Fc provided at a designated area of the memory (not shown) disposed within the control circuit 11 is set at "0". At the next step S89, the clock timer which is caused to start counting at the step, S77 is stopped from counting. At a step S90, the count value of the data timer which is stopped from counting at the step S89 is stored as clock timer count data Md at a designated area of the memory (not shown) disposed within the control circuit 11.

At the next step S91, a ratio between data and clock signal in one bit "Mc/Md" is obtained from the data Mc and the data Md taken in at the above-stated steps S85 and S90.

Then, a check is made to find if the ratio "Mc/Md" is larger than "0.5". If so, the flow proceeds from the step S91 to a step S92. If not, the flow proceeds to a step S93. At the step S92, data is stored as "0" for the designated bit (the 0-th bit at address 0, for example) in the decoded-data storage area set at the step S72 or S94. At a step S93, data is stored as "1" for the designated bit (the 0-th bit at address 0, for example) in the decoded-data storage area set at the step S72 or S94.

At a step S94, the designated bit (the 0-th bit at address 0, for example) within theidesignated decoded data storage area is shifted to a designated bit (the first bit at address 0, for example) where data is to be stored next time. At the next step S95, the number n of data (bits) is added to the count value of the data number counter (not shown). The result of addition is stored at the data number counter.

Further, at the step S96 of FIG. 7, the number n of data stored at the data number counter is compared with a reference data number n0 to find if the number n is equal to or larger than the number n0. If not, the flow proceeds to a step S97. If so, this sequence of processes is terminated, and the flow shifts to the step S45 of FIG. 5. At the step S97, the "unexposed" flag which is at the control memory (not shown) within the control circuit 11 for recognizing an unexposed state is set at "1".

After the step S97, this sequence of processes is terminated, and the flow shifts to the step S45 of FIG. 5. The above description of this sequence of processes shows no process against chattering and noises for the sake of simplification of description. In actuality, however, the first embodiment includes some countermeasures against chattering and noises by software arrangement. For example, such countermeasures include a processes of carrying out sampling a plurality of times and averaging the results of sampling.

Figure 9:
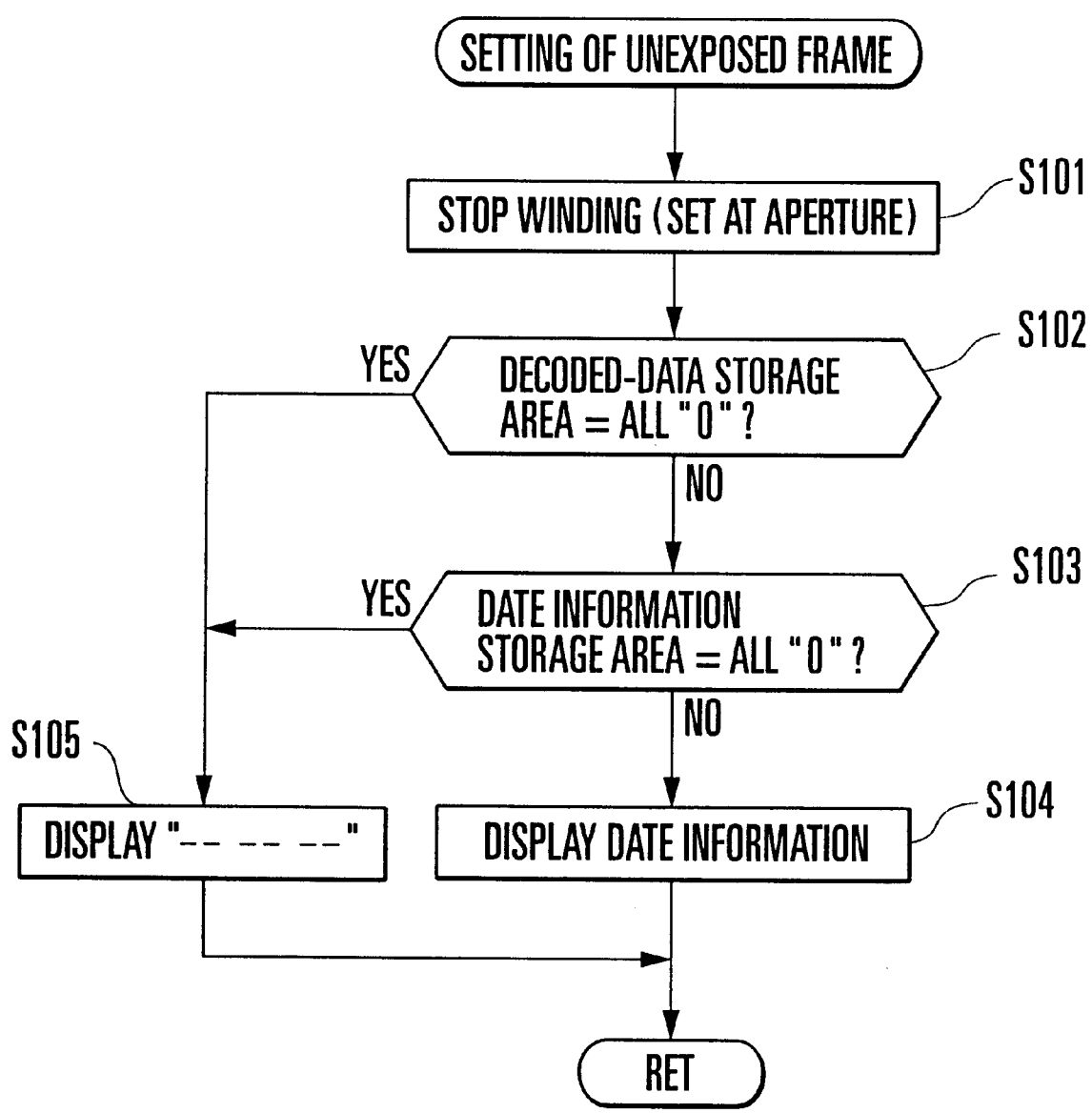
FIG. 9 is a flow chart showing a flow of actions to be performed in the first embodiment of the invention in setting an unexposed frame.

FIG. 9 is a flow chart showing the details of the unexposed frame setting action of the step 47 of FIG. 5 in a sequence of processes. At a step S101 of FIG. 9, the film transport circuit 13 is stopped from driving the film transport motor 5 to set an unexposed frame of the film F at the aperture position.

At a step S102, a check is made to find if all data stored in the magnetic signal decoded-data storage area of the data storing memory of the control circuit 11 are at "0". If so, the flow proceeds to a step S105. If not, the flow proceeds from the step S102 to a step S103. At the step S103, among data stored in the magnetic signal decoded-data storage area of the data storing memory of the control circuit 11, date information data is recognized as predetermined information. Then, a check is made to find if all the date information data are at "0". If so, the flow proceeds to the step S105. If not, the flow proceeds to a step S104.

At the step S104, the date information data recognized at the step S103 is displayed at a specific display area on the liquid crystal display device 22. For example, the display is made to read as "MRC 98 11 1". By this process, data of the last exposed frame among other exposed frames is displayed. At the step S105, a display is made at a specific area on the liquid crystal display device 22 to indicate that no information is found from the reloaded film F. For example, that display may be made to show "-- -- --". After that, this sequence of processes comes to an end.

With the first embodiment arranged as described above, the unexposed frame setting action can be carried out without fail even in a case where a plurality of cameras are involved. Further, in the case of reproduction under favorable conditions, the camera user can be provided with information of varied kinds.

Figure 10:
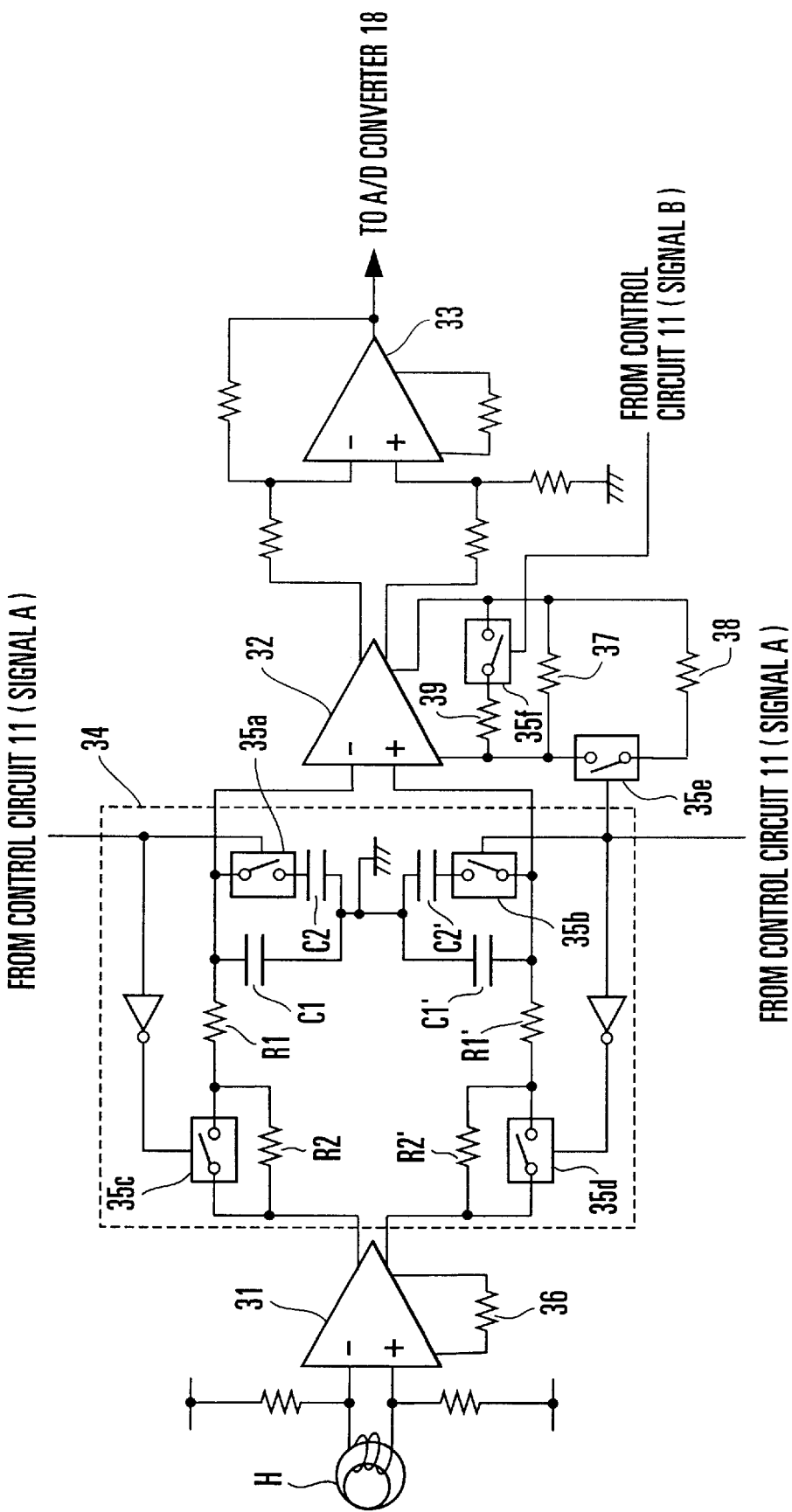
FIG. 10 is a circuit diagram showing in detail the arrangement of a reproducing means included in the camera according to a second embodiment of the invention.

FIG. 10 is a circuit diagram showing, by way of example and in detail, the arrangement of a reproducing means according to a second embodiment of the invention. The arrangement of the second embodiment is basically the same as the arrangement of the first embodiment shown in FIG. 3. All parts of the second embodiment that are the same as those of the first embodiment are, therefore, indicated by the same reference numerals, and the details of them are omitted from the following description, which covers only such parts that differ from the first embodiment.

Referring to FIG. 10, the degree of amplification of the amplifier 32 changes from one degree over to another with the connected state of resistors 37, 38 and 39 changed by changes in the on/off states of analog switches 35e and 35f. In the case of the second embodiment, the on/off state of the analog switch 35f varies independently under the control of a control signal (a signal B) coming from the control circuit 11. The on/off state of the analog switch 35e is arranged, in the same manner as in the first embodiment, to vary under the control of a control signal A supplied from the control circuit 11 in common with other analog switches 35a, 35b, 35c and 35d.

The amplifying degree of the amplifier 32 is assumed to be Ga when both the analog switches 35e and 35f are in their on-states, with both the signals A and B being at their high (H) levels, to be Gb when the analog switch 35e is in its off-state and the analog switch 35f in its on-state, with the signal A at a low (L) level and the signal B at a high level, and to be Gc when both the signals A and B are at their low (L) levels. Then, these amplifying degrees are in the relation of "Ga>Gb>Gc".

Figure 11:
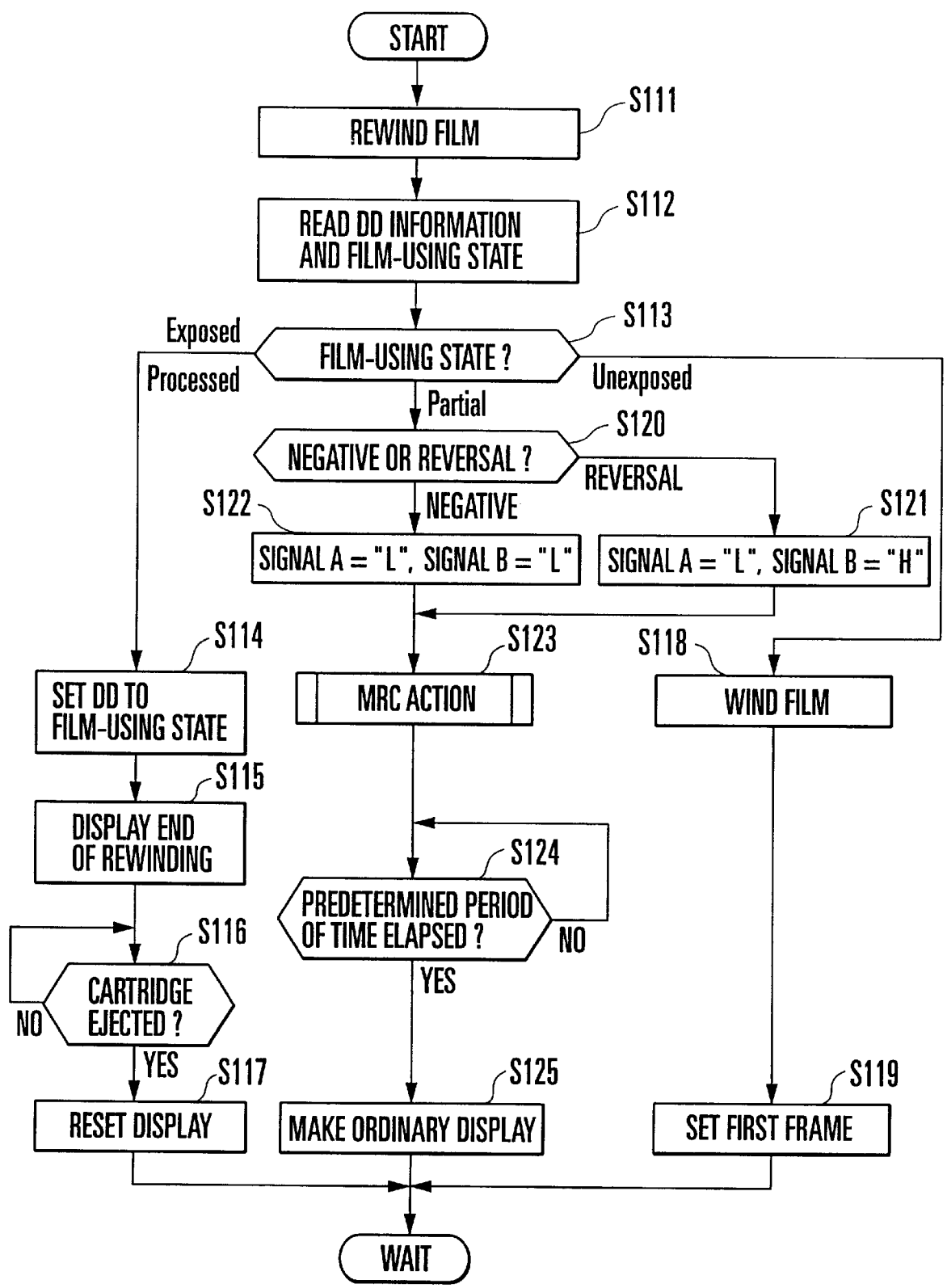
FIG. 11 is a flow chart showing a flow of actions to be performed in the second embodiment of the invention when the camera is loaded with a film cartridge.

FIG. 11 is a flow chart showing a flow of actions to be performed by the control circuit 11 in the second embodiment in loading the camera with a film. In other words, FIG. 11 shows a sequence of processes to be executed when the loading detecting switch 12 is caused to turn on by loading the camera with the film cartridge C.

At a step S111 of FIG. 11, the film transport circuit 13 is caused to drive the film transport motor 5. The film transport motor 5 causes the rewinding fork 7 to rotate in the direction of film rewinding. At a step S112, the information carried by the data disk DD which rotates according to the movement of the rewinding fork 7 within the film cartridge C is obtained by the film-kind discriminating part 11b through the photo-reflectors 1 and 2 and the pulse detecting circuit 14. With the information thus obtained, the using state of the loaded film cartridge C is discriminated and recognized from among various states including an unexposed state, a partially exposed state, an exposed state and a processed (developed) state according to the signal detection timing of the photo-reflector 1.

At a step S113, a check is made for the result of discrimination of a film-using state of the film cartridge C. If the film cartridge C is found either to be exposed or to be processed (developed), the flow proceeds to a step S114. If it is found to be in the partially exposed state, the flow proceeds to a step S120. If it is found to be in the unexposed state, the flow proceeds to a step S118.

At the step S114, the data disk DD is rotated by the film transport motor 5 to its position of the film-using state recognized, i.e., the exposed state or the processed (developed) state on the basis of a signal for the data disk DD generated by the photo-reflector 1 and the pulse detecting circuit 14. With the data disk DD set in this position, the film transport motor 5 is brought to a stop. At the next step S115, the liquid crystal display device 22 is caused to display the end of film rewinding, for example, by causing a cartridge mark to flicker on the display. At a step S116, a check is made for the state of the loading detecting switch 12. When the switch 12 is found to have turned off, the film cartridge C is considered to have been ejected from the camera, and the flow of operation proceeds to a step S117. At the step S117, the display made on the liquid crystal display device 22 at the step S115 is reset, and the flow comes into a standby state for the next operation.

In a case where the flow proceeds from the step S113 to the step S118, the film transport circuit 13 is caused to drive the film transport motor 5 to perform a winding action on the film F (by rotating the spool 8). Then, the flow proceeds from the step S118 to a step S119. At the step Sll9, the perforations Pf, P1 and P2 are detected through the photo-reflectors 3 and 4 and the pulse detecting circuit 14 to obtain a detection signal. Then, on the basis of timing of the detection signal, the film is moved by the film transport motor 5 to bring its first frame to a photo-taking image position, i.e., an aperture position. With the first frame adjusted to the aperture position, the film transport motor 5 is brought to a stop. Further, the liquid crystal display device 22 is caused to display "1" which represents the first frame as a film frame counter. After that, the flow comes into the standby state for the next operation.

If the flow proceeds from the step S113 to the step S120 with the film F recognized as in the partially exposed state, a check is made at the step S120 for the kind of the film loaded. At the step S120, the check is made to find if the film is a negative film or a reversal film according to information on the kinds of film taken in the film-kind discriminating part 11b. If the film is found to be a negative film, the flow proceeds to a step S122. If the film is found to be a reversal film, the flow proceeds to a step S121.

At the step S121, the control circuit 11 sends the control signal A at a low level and the control signal B at a high level to turn the analog switch 35e of FIG. 10 off and the analog switch 35f on. At this step, the amplifying degree is set at a relatively high level. At the step S122, the control circuit 11 sets the amplifying degree at a relatively low level by sending the control signals A and B both at low levels to turn off both the analog switches 35e and 35f.

At the next step S123, since the film F is found to be in the partially exposed state, a film winding action is performed on the film F. In this case, at the step S123, the film F is wound to find a leading frame from among unexposed frames. For this purpose, the reproducing means composed of the magnetic head H and the magnetic information reproducing circuit 17 is caused to read magnetic information recorded at the magnetic recording part Tn for a frame last exposed among other exposed frames of the film F. With the last exposed frame thus found, a frame located next to the last exposed frame is decided to be the leading unexposed frame and is set at the aperture position (not shown). The so-called MRC action is thus carried out. At the next step S124, a check is made for the count value of a timer (not shown) to find if a predetermined period of time, say, 5 sec., has elapsed. If so, the flow proceeds from the step S124 to a step S125. At the step S125, the liquid crystal display device 22 is caused to make an ordinary display. If a film counter display on the liquid crystal display device 22 shows, for example, "10", the display indicates the tenth frame as the set photo-taking frame (unexposed frame). After the step S125, the flow comes into a standby state for the next operation.

The details of the subroutine of this sequence of processes are the same as in the first embodiment described in the foregoing and are, therefore, omitted from description.

Each of the first and second embodiments described above is arranged such that, in a case where the camera is reloaded with a partially exposed film, the film is transported and, at the same time, information is reproduced from the magnetic recording part of the film for a predetermined period of time. The level of the signal thus obtained by reproduction is checked to find if the signal level is higher (or equal to or higher) than a predetermined level. Then, the operation of the camera is switched between an action of deciding the existence or nonexistence of information recorded and an action of decoding information according to the result of check (steps S32 to S47 in FIG. 5). This arrangement enables each of the first and second embodiments to accurately set a leading frame among unexposed frames and to provide the user with information, etc., if the reproducing conditions are favorable.

In other words, the each of the embodiments is arranged only to make a discrimination between the presence and absence of information in a case where the reproduced signal level is either not exceeding (or less than) a predetermined level (steps S36 to S39, S42 and S43 in FIG. 5). This arrangement effectively prevents the user from being provided with erroneous information (because the flow of operation does not proceed to the step S44) and also enables each of the embodiments to accurately set a leader frame among other unexposed frames.

Further, in a case where the reproduced signal level is either not exceeding or less than a predetermined level, the amplifying degree of the amplifier is raised before making the discrimination between the presence and absence of magnetic information (step S42). This arrangement facilitates the process of recognizing the information even under unfavorable conditions to enable each of the embodiments to accurately set a leading unexposed frame among other unexposed frames without fail.

Further, with the reproduced signal level being not exceeding or less than a predetermined level, a filter pass-band is set at a lower band before making the discrimination between the presence and absence of information (step S42). Therefore, the adverse effects of noises or the like under unfavorable conditions can be lessened to permit an accurate setting action on unexposed frames.

In the other case where the reproduced signal level is higher (or equal to or higher) than the predetermined level, on the other hand, the information decoding action is performed. Each of the embodiments then provides the user with information of a predetermined kind included in the decoded information by some suitable informing means, such as a liquid crystal display circuit (step S47). This arrangement ensures that the user is provided with reliable information obtained only under favorable conditions precluding the possibility of misjudgment.

Further, the arrangement for varying the degree of amplification of the amplifier according to the kind of film, i.e., a negative film or a reversal film (steps S120 to S122 in FIG. 11), enables each of the embodiments to obtain reproduced signals at an apposite level.

More specifically, the degree of amplification of the amplifier is raised in the case of a reversal film. Therefore, magnetic signals can be adequately reproduced even in the vent of a reversal film which has a relatively less amount of magnetism.

In the cases of the embodiments disclosed, the film is used as a recording medium. However, the invention is not limited to the use of films but applies also to recording media other than films.

Software arrangement and hardware arrangement in each embodiment disclosed may be interchanged as desired.

While the invention is applied to a camera in the case of each embodiment disclosed, the invention is applicable also to such apparatuses that have information reproducing functions other than cameras or to component elements of such apparatuses.

For example, the invention is applicable to an electronic viewer. In that case, the level of a reproduced signal is examined. If the level is found to be higher than a predetermined level, the information carried by the signal is decoded and displayed along with an image. If the reproduced signal level is found to be equal to or less than the predetermined level, a check is made for the presence or absence of information to find to what extent images are recorded. Such control can be adequately carried out according to the invention.

In the case of each embodiment disclosed, the invention is applied, by way of example, to a camera having the MRC function. However, the invention is not limited to cameras of the kind having the MRC function but applies also to ordinary cameras. For example, in a case where a film which is rewound by an ordinary camera in a state of being used only midway before complete use of the film and the film is to be used further by a camera having the MRC function, indexing a leader frame among unexposed frames cannot be accurately accomplished if the film has no information accurately recorded thereon for exposed frames. Such a problem can be solved in accordance with the invention by arranging the camera to make a check for the reproduction level of record at some frame when a midway rewinding command is given, to decode information if the reproduction level is found to be higher than a predetermined level, then to display such decoded information for every frame, and, if the reproduction level is lower than the predetermined level, to make a check only for the presence or absence of information. Such an arrangement enables the camera to accurately make a discrimination between the presence and absence of information for every exposed frame. In other words, a discrimination between the presence and absence of information can be accurately made for every exposed frames even in a case where the reproduction level is less than a predetermined level under unfavorable conditions. With the film processed in this manner, when the film is loaded on a camera having the MRC function, it is possible to effectively prevent occurrence of such a problem as double exposures.

Figure 12:
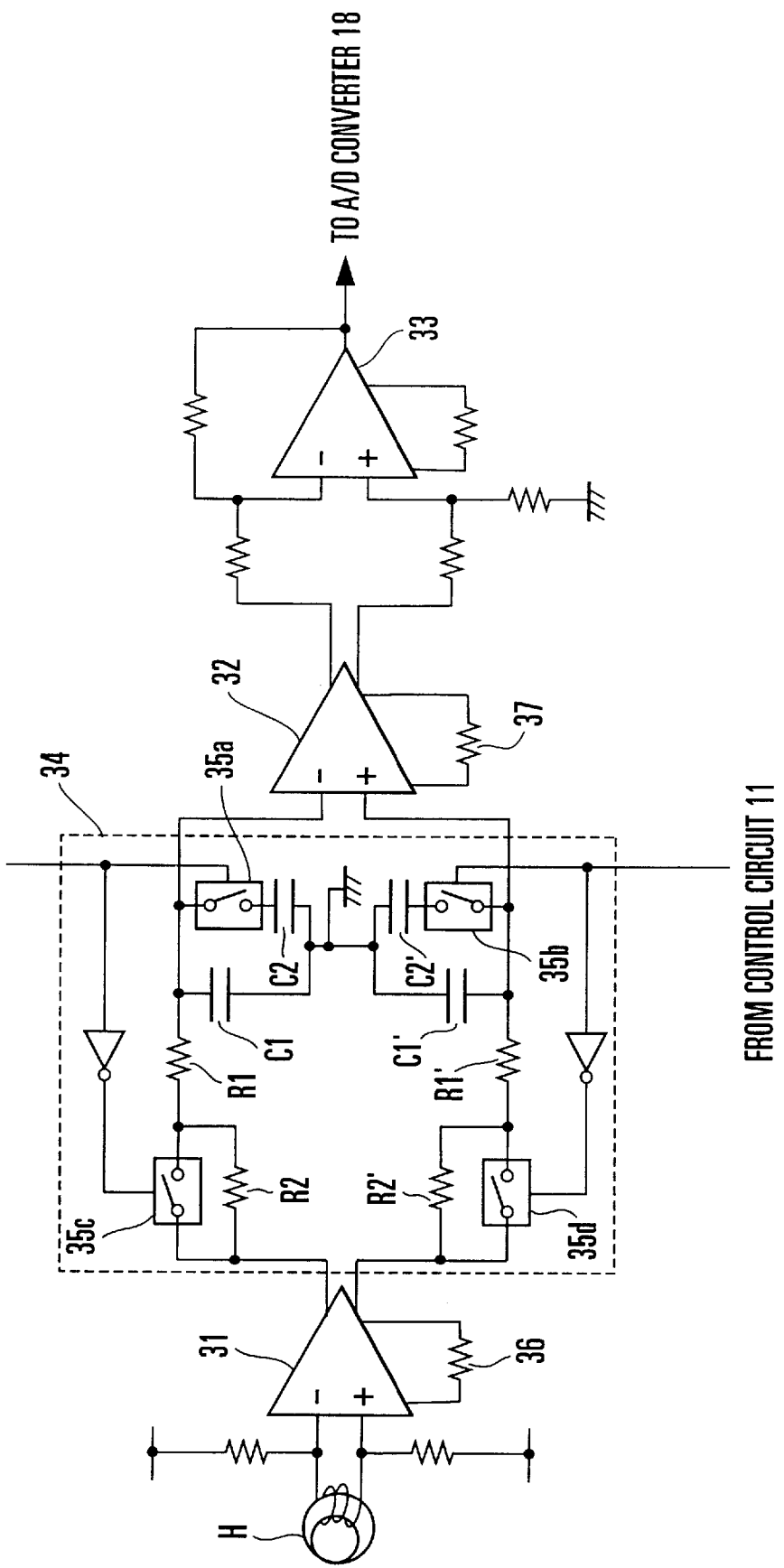
FIG. 12 is a circuit diagram,showing in detail the arrangement of a reproducing means included in the camera according to a third embodiment of the invention.

FIG. 12 is a circuit diagram showing in detail, by way of example, the circuit arrangement of the above-stated reproducing means according to a third embodiment of the invention. All component parts of the third embodiment that are the same as those of the first embodiment shown in FIG. 3 are indicated by the same reference numerals. In the third embodiment, the arrangement of the camera as a whole is assumed to be identical with what is shown in FIGS. 1 and 2.

In the filter circuit 34, when the level of a control signal sent from the control circuit 11 to the analog switches 35a and 35b becomes high, the analog switches 35a and 35b turn on while the analog switches 35c and 35d turn off. Then, the filter circuit 34 is set to be a filter for a low speed having a first passband f1 which has a low time constant (a narrow band). In a case where the level of the control signal sent from the control circuit 11 to the analog switches 35a and 35b becomes low, the analog switches 35a and 35b turn off while the analog switches 35c and 35d turn on. The filter circuit 34 is then set to be a filter for a high speed having a second passband f2 which has a high time constant (wide band).

The passbands f1 and f2 of the filter are in a relation of "f1<f2".

The first passband f1 is set, for example, to be 2 kH or less, and the second passband f2 is set to be 6 kH or less. Then, when the filter circuit 34 is set at the first passband f1, the third embodiment is not readily affected by the interference of any high frequency noises. In a case where the filter circuit 34 is set at the second passband f2, the third embodiment becomes capable of accurately reproducing high-speed signals, although it becomes somewhat weak against external high-frequency noises.

As apparent from the above description, the single filter circuit 34 is arranged to have a plurality of passbands which are variable from one over to another by setting.

Further, while the filter circuit 34 is arranged to be a low-pass filter, the invention is not limited to that arrangement. The filter circuit 34 can be replaced with a known band-pass filter without any problem. In the event of the band-pass filter arrangement, the filter circuit is preferably arranged to have the high-frequency cut-off frequency of the first passband f1 (h) and that of the second passband f2(h) in the relation of $$f1(h) < f2(h)$$

and the width of the first passband Δf1 and that of the second passband Δf2 in the relation of $$\Delta f1 < \Delta f2.$$

Figure 13:
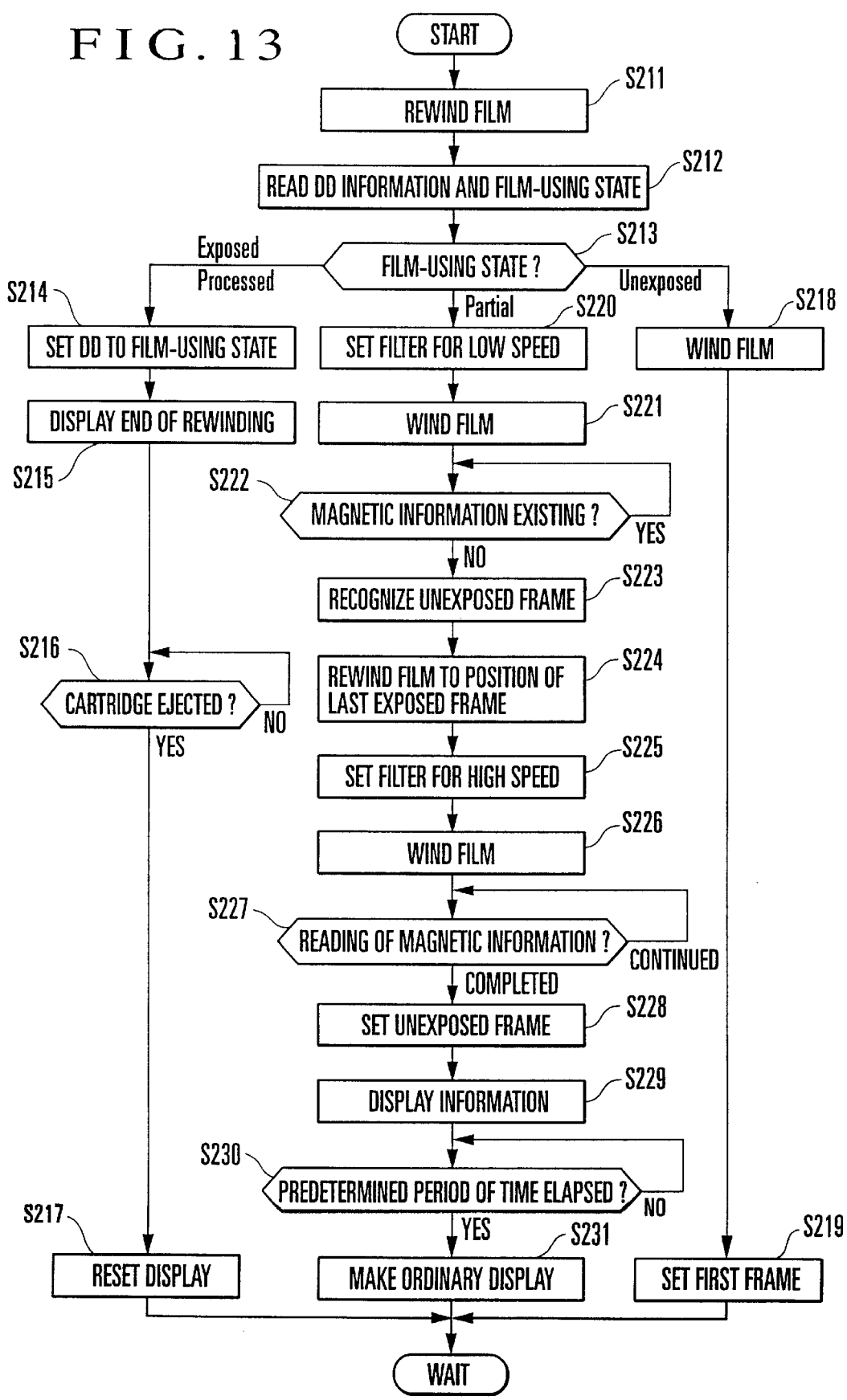
FIG. 13 is a flow chart showing a flow of actions to be performed in the third embodiment of the invention when the camera is loaded with a film cartridge.

FIG. 13 is a flow chart showing a flow of actions to be performed by the control circuit 11 in the third embodiment in loading the camera with a film. In other words, FIG. 13 shows a sequence of processes to be executed when the loading detecting switch 12 is caused to turn on by loading the camera with the film cartridge C.

At a step S211 of FIG. 13, the film transport circuit 13 is caused to drive the film transport motor 5. The film transport motor 5 causes the rewinding fork 7 to rotate in the direction of film rewinding. At a step S212, the information carried by the data disk DD which rotates according to the movement of the rewinding fork 7 within the film cartridge C is taken in through the photo-reflectors 1 and 2 and the pulse detecting circuit 14. With the information thus obtained, the using state of the loaded film cartridge C is discriminated and recognized from among a plurality of film-using states including an unexposed state, a partially exposed state, exposed state and a processed (developed) state according to the signal detection timing of the photo-reflector 1.

At a step S213, a check is made for the result of discrimination of a film-using state of the film cartridge C. If the film cartridge C is found either to be exposed or to be processed (developed), the flow proceeds to a step S214. If it is found to be in the partially exposed state, the flow proceeds to a step S220. If it is found to be in the unexposed state, the flow proceeds to a step S218.

At the step S214, the data disk DD is rotated by the film transport motor 5 to its position of the film-using state recognized, i.e., the exposed state or the processed (developed) state, on the basis of a signal for the data disk DD generated by the photo-reflector 1 and the pulse detecting circuit 14. With the data disk DD set in this position, the film transport motor 5 is brought to a stop. At the next step S215, the liquid crystal display device 22 is caused to display the end of film rewinding, for example, by causing a cartridge mark to flicker on the display. At a step S216, a check is made for the state of the loading detecting switch 12. When the switch 12 is found to have turned off, the film cartridge C is considered to have been ejected from the camera, and the flow of operation proceeds to a step S217. At the step S217, the display made on the liquid crystal display device 22 at the step 5215 is reset, and the flow comes into a standby state for the next operation.

In a case where the flow proceeds from the step S213 to the step S218, the film transport circuit 13 is caused to drive the film transport motor 5 to perform a winding action on the film F (by rotating the spool 8). Then, the flow proceeds from the step. S218 to a step S219. At the step S219, the perforations Pf, P1 and P2 are detected through the photo-reflectors 3 and 4 and the pulse detecting circuit 14 to obtain a detection signal. Then, on the basis of timing of the detection signal, the film is moved by the film transport motor 5 to bring its first frame to a photo-taking image position, i.e., an aperture position. With the first frame adjusted to the aperture position, the film transport motor 5 is brought to a stop. Further, the liquid crystal display device 22 it is caused to display "1" which represents the first frame as a film frame counter. After that, the flow comes into the standby state for the next operation.

In a case where the flow proceeds from the step S213 to the step S220, the filter circuit 34 within the magnetic information reproducing circuit 17 is set as the filter for a low speed having a low time constant (a narrow band) by sending a control signal at a high level to the analog switches 35a and 35b of the filter circuit 34. At the next step S221, the film transport circuit 13 is caused to drive the film transport motor 5 to wind the film F (by rotating the spool 8) in the same manner as at the step S218. At a step S222, a check is made through the reproducing means (composed of the magnetic head H and the magnetic information reproducing circuit 17) to find if there is magnetic information recorded in the magnetic recording part Tn of the film F. If so, the frame which is currently checked is considered to be an exposed frame, and the step S222 is repeated to find the presence or absence of magnetic information at the next frame. If not, the frame is considered to be the leader of unexposed frames, and the flow proceeds to a step S223 to recognize the frame as a leading unexposed frame. Although the further details are omitted from description given here, the position of each frame is detected by the photo-reflectors 3 and 4 and the pulse detecting circuit 14 by detecting the perforations Pf, P1, P2, etc. provided in the film F.

At the next step S223, the frame position (a count number or the like) of the frame decided to be the leading unexposed frame at the step S222 is recognized by storing its position in the memory 21. At a step S224, the film transport circuit 13 is caused to drive the film transport motor 5 to rotate the rewinding fork 7 in the direction of film rewinding. The film is rewound to the position of a frame which is a last exposed frame and is located immediately before the leading unexposed frame. At a step S225, the control signal sent to the analog switches 35a and 35b of the filter circuit 34 disposed within the magnetic information reproducing circuit 17 is set at a low level. By this setting, the filter circuit 34 is set to be a filter for a high speed having a high time constant (a wide band). At a step S226, the film transport circuit 13 is again caused to drive the film transport motor 5 to rotate the spool 8 for winding the film F.

At the next step S227, the reproducing means is caused to read and decode magnetic information from the magnetic recording part Tn (of the last exposed frame) of the film F. This action is carried on until the film F is found to have been wound up to its last exposed frame through the photo-reflectors 3 and 4 and the pulse detecting circuit 14. Upon completion of film winding up to the last exposed frame, the flow proceeds from the step S227 to a step S228. In the meantime, the magnetic information decoded is stored in the memory 21 as data.

At the step S228, the leading unexposed frame recognized at the step S223, i.e., a frame located next to the last exposed frame, is detected by the photo-reflectors 3 and 4 and the pulse detecting circuit 14. The film transport motor 5 is caused to bring the frame thus detected to the photo-taking aperture position. Then, the motor 5 is brought to a stop. The leading unexposed frame is thus set in position. At a step S229, necessary data included in the magnetic information stored in the memory 21 at the step S227, such as a photo-taking date and the like, is selectively displayed on the liquid crystal display device 22. This selective display may be changed to display the information in its entirety if the capacity of the display device or the like permits it. The informing means for making such a display does not have to be the liquid crystal display device but may be some other suitable means, such as informing the user with sounds emitted from some sound emitting element.

At the next step S230, a check is made for the count value of a timer (not shown) to find if a predetermined period of time, say, 5 sec., has elapsed. If so, the flow proceeds from the step S230 to a step S231. At the step S231, the liquid crystal display device 22 is caused to make an ordinary display. If a film counter display on the liquid crystal display device 22 shows, for example, "10", the display indicates the tenth frame as the set photo-taking frame (a leading unexposed frame). After the step S231, the flow comes into a standby state for the next operation.

The third embodiment described above is arranged to use a noise removing filter which is a so-called analog filter and is composed of an electric circuit. The invention is, however, not limited to the use of such an analog filter for the noise removing purpose. The analog filter may be replaced with some digital filter arranged to A/D-convert the magnetic reproduced signal and to carry out D/A conversion and waveform reproduction by an arithmetic digital process.

Figure 14:
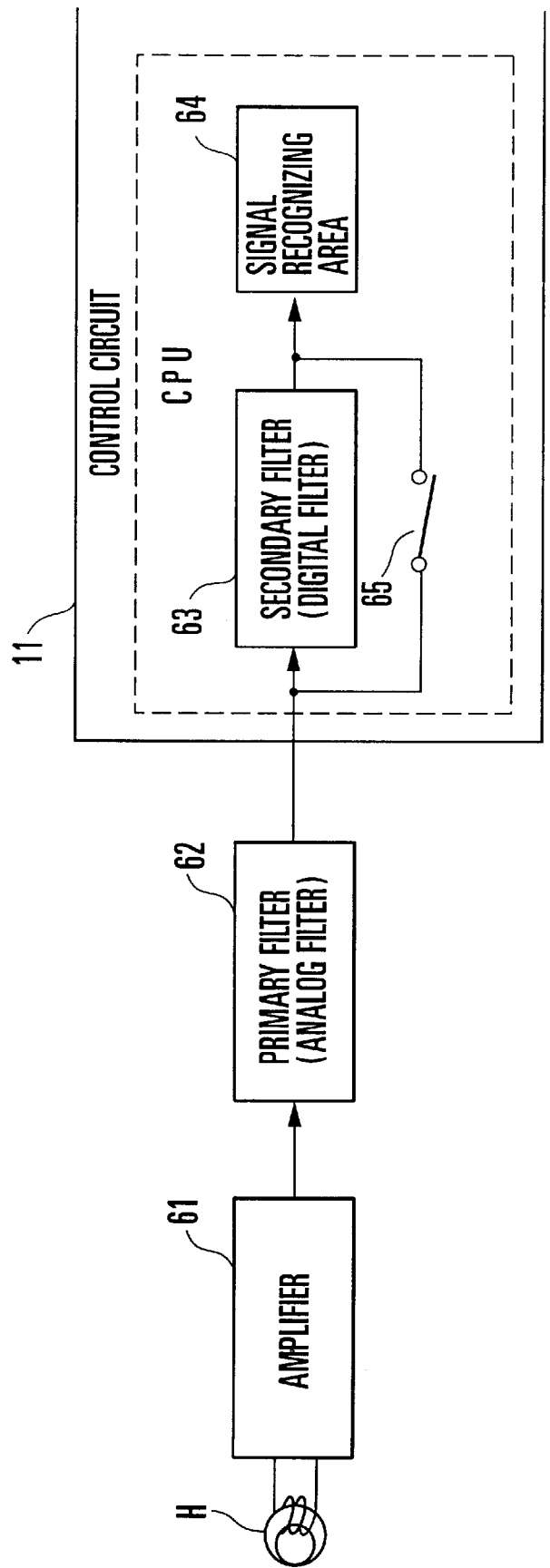
FIG. 14 is a block diagram showing by way of example the arrangement of a reproducing means with a digital filter in each of the embodiments of the invention.

One example of reproducing means using such a digital filter is schematically shown in FIG. 14.

Referring to FIG. 14, a reproduced signal which is generated at the magnetic head H is amplified by an amplifier 61. A noise component of the amplified signal is removed by a primary filter (an analog filter) 62 of a wide band. The output of the primary filter 62 is taken into the control circuit 11. The signal is then caused to pass through a secondary filter (a digital filter) 63 which is of a narrow band and arranged to perform a digital process in a software-like manner. A signal component obtained through the secondary filter 63 is recognized as a reproduced signal at a signal recognizing area 64. Further, in a case where a wide band filter is to be set according to camera actions, the process of the secondary filter is not performed and a signal outputted from the primary filter is directly recognized as the reproduced signal. In that case, a switch 65 shown in FIG. 14 is turned on.

With the reproducing means arranged as shown in FIG. 14, the reproducing means shown in FIG. 12 can be changed to have the filter circuit 34 include only the high-speed filter arrangement and to exclude the resistors, capacitors, analog switches, etc., provided for the low-speed filter arrangement. Then, in a case where the filter circuit is to be used as a high-speed (wide band) filter, the signal outputted from the filter circuit and directly A/D-converted is recognized as the reproduced signal. In a case where the filter circuit is to be used as the low-speed (narrow band) filter, the analog filter is used as an anti-aliasing filter, and the signal outputted from the analog filter circuit is subjected to a software-like digital process carried out at a control circuit (CPU) or the like, including removal of a noise component, D/A conversion, waveform reproduction, etc., by arithmetic operations. Such an arrangement is advantageous in respect to reduction in number of necessary parts, reduction in cost, etc.

As apparent from the description given above, the filter arrangement includes a plurality of filters of different pass-bands arranged by two steps, or by a plurality of steps. The filter arrangement can be set at one of a plurality of pass-bands by varying the state of using the plurality of filters. The filter arrangement permits reduction in number of parts by arranged one of the filters as a digital filter.

A camera according to a fourth embodiment of the invention is next described below. Both the mechanical arrangement and the electrical arrangement of the camera according to the fourth embodiment are the same as those of the third embodiment and are, therefore, omitted from the following description.

Figure 15:
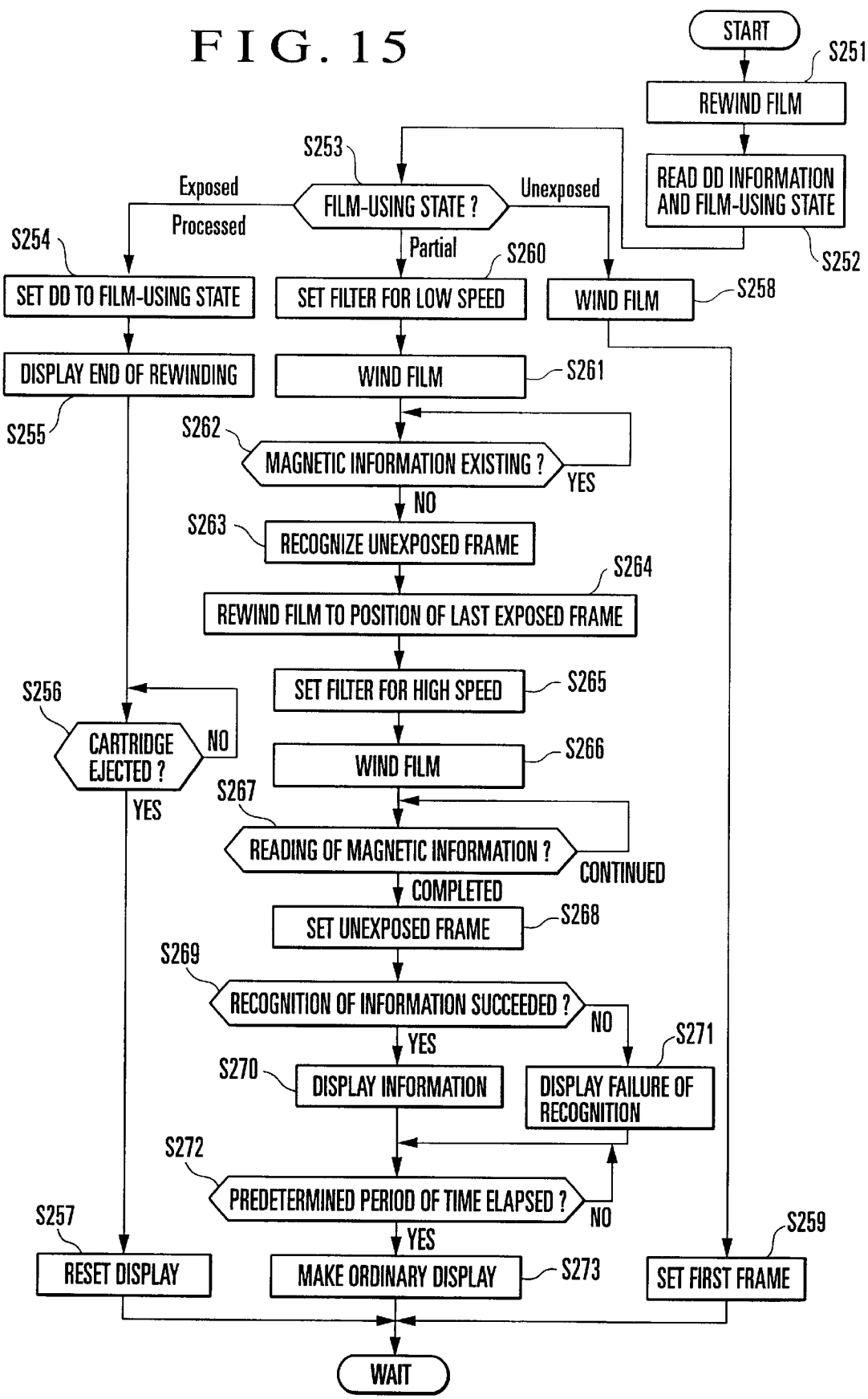
FIG. 15 is a flow chart showing actions to be performed in a fourth embodiment of the invention when the camera is loaded with a film cartridge.

FIG. 15 is a flow chart showing the actions of essential parts of the camera according to the fourth embodiment. In other words, the flow chart shows actions to be performed by the control circuit 11 in loading the camera with a film. More specifically, the flow chart shows a sequence of processes to be performed when the film loading detecting switch 12 is turned on by loading the camera with the film cartridge C.

At a step 251 of FIG. 15, the film transport circuit 13 is caused to drive the film transport motor 5. The film transport motor 5 causes the rewinding fork 7 to rotate in the direction of film rewinding. At a step S252, the information carried by the data disk DD which rotates according to the movement of the rewinding fork 7 within the film cartridge C is taken in through the photo-reflectors 1 and 2 and the pulse detecting circuit 14. With the information thus obtained, the film-using state of the loaded film cartridge C is discriminated and recognized from among the states including an unexposed state, a partially exposed state, an exposed state and a processed (developed) state according to the signal detection timing of the photo-reflector 1.

At a step S253, a check is made for the result of discrimination of a film-using state of the film cartridge C. If the film cartridge C is found either to be exposed or to be processed (developed), the flow proceeds to a step S254. If it is found to be in the partially exposed state, the flow proceeds to a step S260. If it is found to be in the unexposed state, the flow proceeds to a step S258.

At the step S254, the data disk DD is rotated by the film transport motor 5 to its position of the film-using state recognized, i.e., the exposed state or the processed (developed) state, on the basis of a signal for the data disk DD generated by the photo-reflector 1 and the pulse detecting circuit 14. With the data disk DD set in this position, the film transport motor 5 is brought to a stop. At the next step 5255, the liquid crystal display device 22 is caused to display the end of film rewinding, for example, by causing a cartridge mark to flicker on the display. At a step S256, a check is made for the state of the loading detecting switch 12. When the switch 12 is found to have turned off, the film cartridge C is considered to have been ejected from the camera, and the flow of operation proceeds to a step S257. At the step S257, the display made on the liquid crystal display device 22 at the step S255 is reset, and the flow comes to a standby state for the next operation.

In a case where the flow proceeds from the step S253 to the step S258, the film transport circuit 13 is caused to drive the film transport motor 5 to perform a winding action on the film F (by rotating the spool 8). Then, the flow proceeds from the step S258 to a step S259. At the step S259, the perforations Pf, P1 and P2 are detected through the photo-reflectors 3 and 4 and the pulse detecting circuit 14 to obtain a detection signal. Then, on the basis of timing of the detection signal, the film is moved by the film transport motor 5 to bring its first frame to a photo-taking image position, i.e., an aperture position. With the first frame adjusted to the aperture position, the film transport motor 5 is brought to a stop. Further, the liquid crystal display device 22 is caused to display "1" which represents the first frame as a film frame counter. After that, the flow comes into the standby state for the next operation.

In a case where the flow proceeds from the step S253 to the step S260, the filter circuit 34 (FIG. 12) within the magnetic information reproducing circuit 17 is set as the filter for a low speed having a low time constant (a narrow band) by sending a control signal at a high level to the analog switches 35a and 35b of the filter circuit 34. At the next step S261, the film transport circuit 13 is caused to drive the film transport motor 5 to wind the film F (by rotating the spool 8) in the same manner as at the step S258. At a step S262, a check is made through the reproducing means to find if there is magnetic information recorded in the magnetic recording part Tn of the film F. If so, the frame which is currently checked is considered to be an exposed frame, and the step S262 is repeated to find the presence or absence of magnetic information at the next frame. If not, the frame is considered to be the leader of unexposed frames, and the flow proceeds to a step S263 to recognize the frame as a leading unexposed frame.

At the next step S263, the frame position (a count number or the like) of the frame decided to be the leading unexposed frame at the step S262 is recognized by storing data of its position in the memory 21. At a step S264, the film transport circuit 13 is caused to drive the film transport motor 5 to rotate the rewinding fork 7 in the direction of film rewinding. The film is rewound to the position of a frame which is a last exposed frame and is located immediately before the leading unexposed frame. At a step S265, the control signal sent to the analog switches 35a and 35b of the filter circuit 34 disposed within the magnetic information reproducing circuit 17 is set at a low level. By this setting, the filter circuit 34 is set as a filter for a high speed having a high time constant (a wide band). At a step S266, the film transport circuit 13 is again caused to drive the film transport motor 5 to rotate the spool 8 for winding the film F.

At the next step S267, the reproducing means is caused to read and decode magnetic information from the magnetic recording part Tn (of the last exposed frame) of the film F. This action is carried on until the film F is found to have been wound up to its last exposed frame through the photo-reflectors 3 and 4 and the pulse detecting circuit 14. Upon completion of film winding up to the last exposed frame, the flow proceeds from the step S267 to a step S268. In the meantime, the magnetic information decoded is stored in the memory 21 as data.

At the step S268, the leading unexposed frame recognized at the step S263, i.e., a frame located next to the last exposed frame, is detected by the photo-reflectors 3 and 4 and the pulse detecting circuit 14. The film transport motor 5 is caused to bring the frame thus detected to the photo-taking aperture position. Then, the motor 5 is brought to a stop. At a step S269, a check is made to find if the magnetic information stored in the memory 21 at the step S267 has been duly recognized as prescribed information, such as a photo-taking date, exposure information, information on use of a flash device, etc. If so, the flow proceeds to a step S270. If not, the flow proceeds to a step S271.

At the step S270, among data included in the magnetic information recognized as normal information and stored in the memory 21, necessary data (such as a phototaking date, etc.) is selectively displayed on the liquid crystal display device 22. At the step S271, a display is made on the liquid crystal display device 22 informing the user that the information has been unrecognizable. The display is made, for example, as "NG" or "---".

At a step S272, a check is made for the count value of a timer (not shown) to find if a predetermined period of time, say, 5 sec., has elapsed. If so, the flow proceeds from the step S272 to a step S273. At the step S273, the liquid crystal display device 22 is caused to make an ordinary display. If a film counter display on the liquid crystal display device 22 shows, for example, "10", the display indicates the tenth frame as the set photo-taking frame (an unexposed frame). After the step S273, the flow comes into a standby state for the next operation.

The arrangement of each of the third and fourth embodiments described above applies not only to films but also to recording media other than films.

Software arrangement and hardware arrangement in each embodiment disclosed may be interchanged as desired.

While the invention is applied to a camera in the case of each embodiment disclosed, the invention is applicable also to such apparatuses that have information reproducing functions other than cameras or to component elements of such apparatuses. For example, the invention is applicable to an electronic viewer. In that case, the electronic viewer can be easily arranged to have some additional function according to the invention. The addition function may be arranged, for example, as follows. A filter for a low speed is set to make a check with it for the presence or absence of information for each image. Then, if detailed information is required for some image, a filter for a high speed is set to decode information on the image. After that, the information decoded can be displayed along with the image.

What is claimed is:

1. An information reproducing apparatus having a detecting circuit which detects an information signal recorded on a recording medium and a filter which receives a signal from said detecting circuit,
    a passband of said filter being arranged to be variable,
    said information reproducing apparatus comprising a varying circuit which varies the passband of said filter between a passband to be used when said information reproducing apparatus performs a deciding action to decide whether or not information is recorded on the recording medium and a passband to be used when said information reproducing apparatus performs a decoding action to decode information recorded on the recording medium.

2. An information reproducing apparatus according to claim 1, wherein said decoding action is performed when the level of a signal reproduced by said information reproducing apparatus is at a value larger than a predetermined value.

3. An information reproducing apparatus according to claim 1, wherein said varying circuit sets the passband for said decoding action to a passband including at least a higher frequency than the passband for said deciding action.

4. An information reproducing apparatus according to claim 1, wherein said varying circuit sets the passband for said decoding action to a passband wider than the passband for said deciding action.

5. An information reproducing apparatus according to claim 3, wherein said information reproducing apparatus first performs said deciding action, and then performs said decoding action for information on an area which has been decided, as a result of said deciding action, to have information recorded thereon.

6. An information reproducing apparatus according to claim 5, wherein the recording medium is arranged to have information recorded on each of a plurality of areas thereof, and said decoding action for information is performed on an area which has been decided, as a result of said deciding action, to have information last recorded thereon.

7. A camera equipped with an information reproducing apparatus having a head which reads information recorded on a recording area provided for each of frames of a film and a filter which receives a signal from said head,
    a passband of said filter being arranged to be variable,
    said camera comprising a varying circuit which varies the passband of said filter between a passband to be used when said information reproducing apparatus performs a deciding action to decide whether or not information is recorded on the recording area and a passband to be used when said information reproducing apparatus performs a decoding action to decode information recorded on the recording area.

8. A camera according to claim 7, wherein said varying circuit sets the passband for said decoding action to a passband including at least a higher frequency than the passband for said deciding action.

9. A camera according to claim 7, wherein said varying circuit sets the passband for said decoding action to a passband wider than the passband for said deciding action.

10. A camera according to claim 7, wherein said camera finds out a leader frame among unexposed frames by using said deciding action on the recording area for each frame, and performs said decoding action on the recording area of an exposed frame.

11. A camera according to claim 10, wherein said decoding action is performed on the recording area of an exposed frame located next to an unexposed frame.

12. A camera according to claim 7, wherein said decoding action is performed when the level of a signal reproduced by said information reproducing apparatus is at a value larger than a predetermined value.

13. An information reproducing apparatus having a detecting circuit which detects an information signal recorded on a recording medium and an amplifying circuit which amplifies a signal from said detecting circuit,
    a gain of said amplifying circuit being arranged to be variable,
    said information reproducing apparatus comprising a varying circuit which varies the gain of said amplifying circuit between a gain to be used when said information reproducing apparatus performs a deciding action to decide whether or not information is recorded on the recording medium and a gain to be used when said information reproducing apparatus performs a decoding action to decode information recorded on the recording medium.

14. An information reproducing apparatus according to claim 13, wherein said varying circuit sets the gain for said decoding action to a gain lower than the gain for said deciding action.

15. An information reproducing apparatus according to claim 13, wherein said decoding action is performed when the level of a signal reproduced by said information reproducing apparatus is at a value larger than a predetermined value.

16. A camera equipped with an information reproducing apparatus having a head which reads information recorded on a recording area provided for each of frames of a film and an amplifying circuit which amplifies a signal from said head, a gain of said amplifying circuit being arranged to be variable, said camera comprising a varying circuit which varies the gain of said amplifying circuit between a gain to be used when said information reproducing apparatus performs a deciding action to decide whether or not information is recorded on the recording area and a gain to be used when said information reproducing apparatus performs a decoding action to decode information recorded on the recording area.

17. A camera according to claim 16, wherein said varying circuit sets the gain for said decoding action to a gain lower than the gain for said deciding action.

18. A camera according to claim 16, wherein said decoding action is performed when the level of a signal reproduced by said information reproducing apparatus is at a value larger than a predetermined value.

19. A reproducing apparatus having a reproducing circuit which reproduces information recorded on a recording medium, said reproducing apparatus comprising:

a level deciding circuit which decides the level of a reproduced signal from said reproducing circuit; and a processing circuit which performs, on the recorded information, functional processing that varies according to a result of decision made by said level deciding circuit.

20. A reproducing apparatus according to claim 19, wherein said processing circuit performs a decoding action for the information, when the result of decision made by said level deciding circuit indicates that the level of the reproduced signal is at a value higher than a predetermined value.

21. A reproducing apparatus according to claim 19, wherein said processing circuit performs a deciding action to decide whether or not information is recorded on the recording medium, when the result of decision made by said level deciding circuit indicates that the level of the reproduced signal is at a value lower than a predetermined value.

22. A camera equipped with a reproducing apparatus having a reproducing circuit which reproduces information recorded on a recording area provided for each of frames of a film, said camera comprising:

a level deciding circuit which decides the level of a reproduced signal from said reproducing circuit; and a processing circuit which performs, on the recorded information, functional processing that varies according to a result of decision made by said level deciding circuit.

23. A camera according to claim 22, wherein said processing circuit performs a decoding action for the information, when the result of decision made by said level deciding circuit indicates that the level of the reproduced signal is at a value higher than a predetermined value.

24. A camera according to claim 22, wherein said processing circuit performs a deciding action to decide whether or not information is recorded on the recording medium, when the result of decision made by said level deciding circuit indicates that the level of the reproduced signal is at a value lower than a predetermined value.

* * * * *

UNITED STATES PATENT AND TRADEMARK OFFICE
CERTIFICATE OF CORRECTION

PATENT NO. : 6,480,680 B1  Page 1 of 1
DATED : November 12, 2002
INVENTOR(S) : Toshiharu Ueda It is certified that error appears in the above-identified patent and that said Letters Patent is hereby corrected as shown below:

Column 4,
Line 59, delete "diagram,showing" and insert -- diagram showing --.

Column 8,
Line 55, delete "522" and insert -- S22 --.

Column 9,
Line 50, delete "vth(L0)" and insert -- Vth(L0) --.

Column 13,
Line 10, delete "theidesignated" and insert -- the designated --.

Column 19,
Line 8, delete "5215" and insert -- S215 --.

Column 21,
Line 58, delete "5255" and insert -- S255 --.

Signed and Sealed this

Twenty-fifth Day of November, 2003

JAMES E. ROGAN
*Director of the United States Patent and Trademark Office*